(12) United States Patent
Ostwal et al.

(10) Patent No.: US 12,356,430 B2
(45) Date of Patent: Jul. 8, 2025

(54) SYSTEM AND METHOD FOR CONCATENATION AND PREPROCESSING IN DATA PLANE

(71) Applicant: Samsung Electronics Co., Ltd., Suwon-si (KR)

(72) Inventors: Nayan Ostwal, Bangalore (IN); Aneesh Deshmukh, Bangalore (IN); Anshuman Nigam, Bangalore (IN); Jiyoung Cha, Suwon-si (KR); Jungsoo Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 358 days.

(21) Appl. No.: 17/991,331

(22) Filed: Nov. 21, 2022

(65) Prior Publication Data

US 2023/0090572 A1   Mar. 23, 2023

Related U.S. Application Data

(63) Continuation of application No. PCT/KR2021/007280, filed on Jun. 10, 2021.

(30) Foreign Application Priority Data

Jun. 12, 2020 (IN) .............................. 202041024699
Jun. 2, 2021 (IN) ............................. 2020 41024699

(51) Int. Cl.
*H04W 72/231* (2023.01)
*H04L 1/08* (2006.01)
(Continued)

(52) U.S. Cl.
CPC .............. *H04W 72/231* (2023.01); *H04L 1/08* (2013.01); *H04L 1/1642* (2013.01); *H04W 28/065* (2013.01)

(58) Field of Classification Search
CPC ........... H04W 28/065; H04W 72/1263; H04W 72/231; H04L 1/0007; H04L 1/1642; H04L 1/1671; H04L 1/1685; H04L 1/1861

See application file for complete search history.

(56) References Cited

U.S. PATENT DOCUMENTS 10,904,886 B2   1/2021   Loehr et al.
11,470,499 B2   10/2022  Kim
(Continued)

FOREIGN PATENT DOCUMENTS

CN   109936858 A   6/2019
EP   3 319 252 A1   5/2018
(Continued)

OTHER PUBLICATIONS

"Efficient Reordering-Reassembly PDCP and RLC Window Management Algorithm in 5G and Beyond"; Pandrey et al.; 2020 IEEE International Conference on Electronics, Computing and Communication Technologies (CONECCT); date of conference Jul. 2020 (Year: 2020).*

(Continued)

*Primary Examiner* — Benjamin H Elliott, IV
(74) *Attorney, Agent, or Firm* — Jefferson IP Law, LLP

(57) ABSTRACT

The disclosure relates to a fifth generation (5G) communication system or a sixth generation (6G) communication system for supporting higher data rates beyond a fourth generation (4G) communication system such as long-term evolution (LTE). A system and a method for optimizing radio link control (RLC) mechanism in data plane are provided.

18 Claims, 33 Drawing Sheets

(51) Int. Cl.
*H04L 1/1607* (2023.01)
*H04W 28/06* (2009.01)

(56) References Cited

U.S. PATENT DOCUMENTS

| | | | | |
|---|---|---|---|---|
| 2011/0188377 | A1* | 8/2011 | Kim | H04L 47/10 |
| | | | | 370/235 |
| 2013/0070682 | A1* | 3/2013 | Kim | H04L 5/0032 |
| | | | | 370/328 |
| 2016/0373962 | A1* | 12/2016 | Wang | H04W 28/065 |
| 2017/0111945 | A1* | 4/2017 | Yi | H04W 76/14 |
| 2018/0097918 | A1* | 4/2018 | Nuggehalli | H04L 5/0046 |
| 2018/0124843 | A1* | 5/2018 | Shaheen | H04W 76/11 |
| 2018/0206213 | A1* | 7/2018 | Kim | H04L 69/22 |
| 2018/0287748 | A1* | 10/2018 | Kim | H04L 47/30 |
| 2018/0359657 | A1* | 12/2018 | Kim | H04W 28/06 |
| 2018/0368166 | A1* | 12/2018 | Jheng | H04W 72/21 |
| 2019/0150217 | A1* | 5/2019 | Kim | H04W 76/19 |
| | | | | 370/329 |
| 2019/0174575 | A1* | 6/2019 | Shah | H04W 80/08 |
| 2019/0215902 | A1* | 7/2019 | Tang | H04L 47/34 |
| 2019/0230667 | A1* | 7/2019 | Loehr | H04L 1/0078 |
| 2021/0176661 | A1* | 6/2021 | Kim | H04W 28/0278 |
| 2021/0352527 | A1* | 11/2021 | Sridharan | H04L 1/1822 |
| 2023/0090572 | A1* | 3/2023 | Ostwal | H04L 1/1642 |
| | | | | 370/329 |

FOREIGN PATENT DOCUMENTS

| | | |
|---|---|---|
| WO | 2018/085203 A1 | 5/2018 |
| WO | 2018/218416 A1 | 12/2018 |
| WO | 2019/093784 A1 | 5/2019 |

OTHER PUBLICATIONS

"Radio Link Control and Logical Channel Prioritization in 5G NR"; Gupta; Department of Electrical Engineering Indian Institute of Technology Madras; May 2019 (Year: 2019).*
Extended European Search Report dated Sep. 27, 2023, issued in European Application No. 21822287.5.
3GPP; TSG RAN; E-UTRA; RLC protocol specification (Release 15), 3GPP TS 36.322 V15.3.0 (Sep. 2019), Sep. 27, 2019.
3GPP; TSG RAN; E-UTRA; PDCP specification (Release 16), 3GPP TS 36.323 V16.0.0 (Mar. 2020), Apr. 9, 2020.
International Search Report dated Sep. 7, 2021, issued in International Patent Application No. PCT/KR2021/007280.
Indian Office Action dated Apr. 18, 2022, issued in Indian Patent Application No. 202041024699.

* cited by examiner

FIG. 6
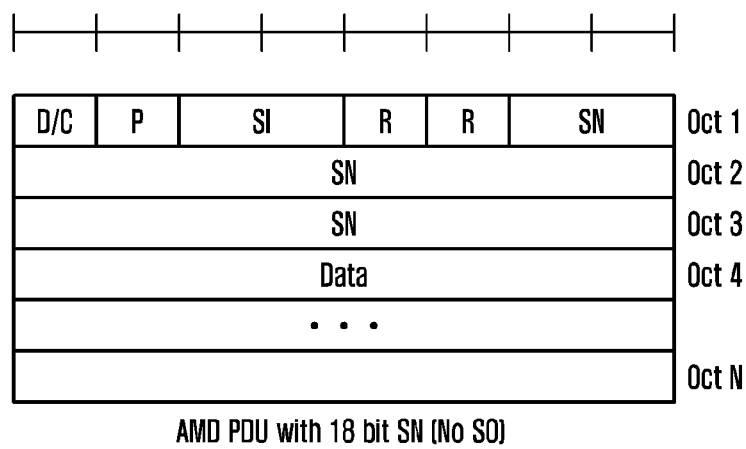
AMD PDU with 18 bit SN (No SO)
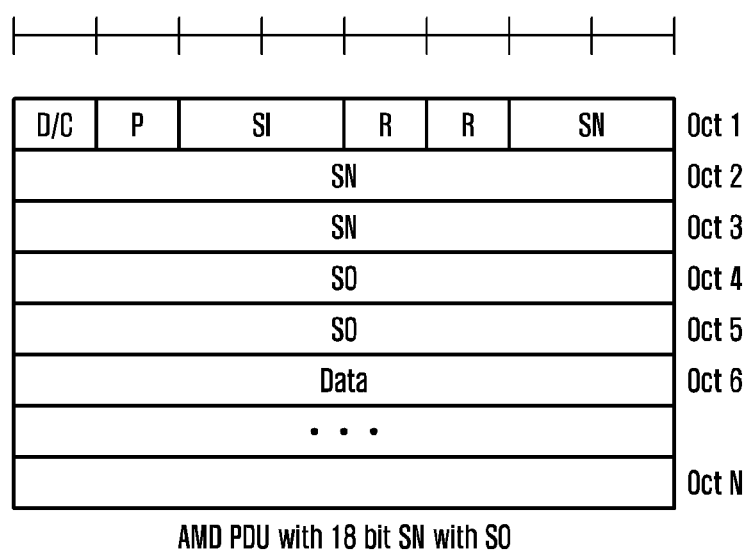
AMD PDU with 18 bit SN with SO

FIG. 13

RLC UMD Header as per variant 1

| FI | R | R | R | R | R | Oct 1 |
|---|---|---|---|---|---|---|
| | SN | | | | | Oct 2 |
| | SN | | | | | Oct 3 |
| | Length | | | | | Oct 4 |
| | Length | | | | | Oct 5 |
| E | Length | | | | | Oct 6 |
| | PDCP SDU 1 | | | | | Oct 5 + SDU Length1 = L |
| | ... | | | | | |
| | Length | | | | | Oct L + 1 |
| E | Length | | | | | Oct L + 2 |
| | PDCP SDU 2 | | | | | Oct L + 3 |
| | ... | | | | | |
| | Length | | | | | Oct L + 2 + SDU Length2 = M |
| E | Length | | | | | Oct M + 1 |
| | PDCP SDU 3 | | | | | Oct M + 2 |
| | ... | | | | | Oct M + 3 |
| | | | | | | Oct M + 2 + SDU Length 3 |

UMD PDU with 16 bit SN for FI != 00

RLC UMD Header as per variant 1

| FI | R | R | R | R | R | Oct 1 |
|---|---|---|---|---|---|---|
| | Length | | | | | Oct 2 |
| E | Length | | | | | Oct 3 |
| | PDCP SDU 1 | | | | | Oct 3 + SDU Length1 = L |
| | ... | | | | | |
| | Length | | | | | Oct L + 1 |
| E | Length | | | | | Oct L + 2 |
| | PDCP SDU 2 | | | | | Oct L + 3 |
| | ... | | | | | |
| | Length | | | | | Oct L + 2 + SDU Length2 = M |
| E | Length | | | | | Oct M + 1 |
| | PDCP SDU 3 | | | | | Oct M + 2 |
| | ... | | | | | Oct M + 3 |
| | | | | | | Oct M + 2 + SDU Length 3 |

UMD PDU with no SN for FI = 00

FIG. 14

| | |
|---|---|
| RLC Header as per variant 3 | |

| D/C | P | RF | FI | SI | R | Oct 1 |
|---|---|---|---|---|---|---|
| SN | | | | | | Oct 2 |
| SN | | | | | | Oct 3 |
| NumSDUs | | | | | | Oct 4 |
| Length1 | | | | | | Oct 5 |
| Length1 | | | | | | Oct 6 |
| PDCP SDU 1 | | | | | | Oct 7 .. Oct 6 + SduLength = L |
| Length2 | | | | | | Oct L + 1 |
| Length2 | | | | | | Oct L + 2 |
| PDCP SDU 2 | | | | | | Oct L + 3 ... Oct L + 2 + SduLength = M |
| . . . | | | | | | Oct 4 + 2 * n-2 + sum of SduLength = N |
| Length N-1 | | | | | | Oct N + 1 |
| Length N-1 | | | | | | Oct N + 2 |
| PDCP SDU N-1 | | | | | | Oct N + 3 ... Oct N + 2 + SduLength = O |
| Length N | | | | | | Oct O + 1 |
| Length N | | | | | | Oct O + 2 |
| PDCP SDU N | | | | | | Oct O + 3 ... Oct O + 2 + SduLength |

AMD PDU with 16 bit SN
Or
AMD PDU segment with 16 bit SN with No So

FIG. 15

RLC UMD Header as per variant 3

| D/C | P | RF | FI | SI | R | Oct 1 |
|---|---|---|---|---|---|---|
| | | | NumSDUs | | | Oct 2 |
| | | | Length1 | | | Oct 3 |
| | | | Length1 | | | Oct 4 |
| | | | PDCP SDU 1 | | | Oct 5 .. Oct 4 + SduLength = L |
| | | | Length2 | | | Oct L + 1 |
| | | | Length2 | | | Oct L + 2 |
| | | | PDCP SDU 2 | | | Oct L + 3 ... Oct L + 2 + SduLength = M |
| | | | ... | | | Oct 4 + 2 * n-2 + sum of SduLength = N |
| | | | Length N-1 | | | Oct N + 1 |
| | | | Length N-1 | | | Oct N + 2 |
| | | | PDCP SDU N-1 | | | Oct N + 3 ... Oct N + 2 + SduLength = O |
| | | | Length N | | | Oct O + 1 |
| | | | Length N | | | Oct O + 2 |
| | | | PDCP SDU N | | | Oct O + 3 ... Oct O + 2 + SduLength |

UMD PDU with no SN for FI = 00

RLC UMD Header as per variant 3

| D/C | P | RF | FI | SI | R | Oct 1 |
|---|---|---|---|---|---|---|
| | | | SN | | | Oct 2 |
| | | | SN | | | Oct 3 |
| | | | NumSDUs | | | Oct 4 |
| | | | Length1 | | | Oct 5 |
| | | | Length1 | | | Oct 6 |
| | | | PDCP SDU 1 | | | Oct 7 .. Oct 6 + SduLength = L |
| | | | Length2 | | | Oct L + 1 |
| | | | Length2 | | | Oct L + 2 |
| | | | PDCP SDU 2 | | | Oct L + 3 ... Oct L + 2 + SduLength = M |
| | | | ... | | | Oct 4 + 2 * n-2 + sum of SduLength = N |
| | | | Length N-1 | | | Oct N + 1 |
| | | | Length N-1 | | | Oct N + 2 |
| | | | PDCP SDU N-1 | | | Oct N + 3 ... Oct N + 2 + SduLength = O |
| | | | Length N | | | Oct O + 1 |
| | | | Length N | | | Oct O + 2 |
| | | | PDCP SDU N | | | Oct O + 3 ... Oct O + 2 + SduLength |

UMD PDU with 16 bit SN for FI = 00

FIG. 17

RLC Header as per variant 1

| D/C | P | RF | FI | SI | R | | |
|---|---|---|---|---|---|---|---|
| | | | SN | | | | Oct 1 |
| | | | SN | | | | Oct 2 |
| E | | | | | | | Oct 3 |
| | | Length 1 | | | | | Oct 4 |
| | | Length 1 | | | | | Oct 5 |
| E | | | | | | | Oct 6 |
| | | Length 2 | | | | | Oct 7 |
| | | Length 2 | | | | | Oct 8 |
| E | | ... | | | | | Oct 3 + 2 * (N-1) |
| | | ... | | | | | Oct 3 + 2 * (N-1) + 1 |
| E | | Length N | | | | | Oct 3 + 2 * N = M |
| | | Length N | | | | | Oct M + 1 |
| | | PDCP SDU 1 | | | | | Oct M + SduLength1 = 0 |
| | | ... | | | | | Oct 0 + 1 |
| | | PDCP SDU 2 | | | | | Oct 0 + SduLength2 |
| | | ... | | | | | Oct M + SumlSdu Length 0... N-1 ) = P |
| | | PDCP SDU N | | | | | Oct P + 1 |
| | | ... | | | | | Oct P + SduLength N |

RLC Header as per variant 3

| D/C | P | RF | FI | SI | R | | |
|---|---|---|---|---|---|---|---|
| | | | SN | | | | Oct 1 |
| | | | SN | | | | Oct 2 |
| | | | SN | | | | Oct 3 |
| | | Num SDU | | | | | Oct 4 |
| | | Length1 | | | | | Oct 5 |
| | | Length1 | | | | | Oct 6 |
| | | Length2 | | | | | Oct 7 |
| | | Length2 | | | | | Oct 8 |
| | | ... | | | | | Oct 9 |
| | | ... | | | | | Oct 4 + 2 * (N-1) |
| | | Length N | | | | | Oct 4 + 2 * (N-1) +1 |
| | | Length N | | | | | Oct 4 + 2 * N = M |
| | | PDCP SDU 1 | | | | | Oct M + 1 |
| | | ... | | | | | Oct M + SduLength1 = 0 |
| | | PDCP SDU 2 | | | | | Oct 0 + 1 |
| | | ... | | | | | Oct 0 + SduLengt2 |
| | | PDCP SDU N | | | | | Oct M + SumlSdu Length 0... N-1) = P |
| | | ... | | | | | Oct P + 1 |
| | | | | | | | Oct P + SduLengt N |

AMD PDU with 16 bit SN
Or
AMD PDU segment with 16 bit SN with No So

FIG. 19

| FI | R | R | R | R | R | | |
|---|---|---|---|---|---|---|---|
| | | | | Num SDU | | | Oct 1 |
| | | | | Length 1 | | | Oct 2 |
| | | | | Length 1 | | | Oct 3 |
| | | | | Length 2 | | | Oct 4 |
| | | | | Length 2 | | | Oct 5 |
| | | | | · · · | | | Oct 6 |
| | | | | · · · | | | Oct 7 |
| | | | | Length N | | | Oct 2 + 2 * (N-1) |
| | | | | Length N | | | Oct 2 + 2 * (N-1) + 1 |
| | | | | PDCP SDU 1 | | | Oct 2 + 2 * N = M |
| | | | | · · · | | | Oct M + 1 |
| | | | | PDCP SDU 2 | | | Oct M + SduLength1 = O |
| | | | | · · · | | | Oct O + 1 |
| | | | | · · · | | | Oct O + SduLength2 |
| | | | | PDCP SDU N | | | Oct M + SumiSdu Length O... N−1 ] = P |
| | | | | · · · | | | Oct P + 1 |
| | | | | | | | Oct P + SduLength N |

RLC UMD Header as per variant 3

UMD PDU with no SN for FI = 00

| FI | R | R | R | R | R | R | R |
|---|---|---|---|---|---|---|---|
| | | | | | | | Oct 1 |
| | | | | SN | | | Oct 2 |
| | | | | SN | | | Oct 3 |
| | | | | Num SDU | | | Oct 4 |
| | | | | Length 1 | | | Oct 5 |
| | | | | Length 1 | | | Oct 6 |
| | | | | Length 2 | | | Oct 7 |
| | | | | Length 2 | | | Oct 8 |
| | | | | · · · | | | Oct 9 |
| | | | | · · · | | | Oct 4 + 2 * (N-1) |
| | | | | Length N | | | Oct 4 + 2 * (N-1) + 1 |
| | | | | Length N | | | Oct 4 + 2 * N = M |
| | | | | PDCP SDU 1 | | | Oct M + 1 |
| | | | | · · · | | | Oct M + SduLength1 = O |
| | | | | PDCP SDU 2 | | | Oct O + 1 |
| | | | | · · · | | | Oct O + SduLength2 |
| | | | | · · · | | | Oct M + SumiSdu Length O... N−1 ] = P |
| | | | | PDCP SDU N | | | Oct P + 1 |
| | | | | · · · | | | Oct P + SduLength N |

RLC UMD Header as per variant 3

UMD PDU with SN for FI != 00

FIG. 23

RLC UMD Header as per variant 3

| FI | R | R | R | R | R | |
|---|---|---|---|---|---|---|
| Num SDU | | | | | | Oct 1 |
| Length 1 | | | | | | Oct 2 |
| Length 1 | | | | | | Oct 3 |
| Length 2 | | | | | | Oct 4 |
| Length 2 | | | | | | Oct 5 |
| ... | | | | | | ... |
| ... | | | | | | ... |
| Length N | | | | | | Oct 2 + 2 * (N-2) |
| Length N | | | | | | Oct 2 + 2 * (N-2) + 1 |
| PDCP SDU 1 | | | | | | Oct 2 + 2 * (N-1) = M |
| ... | | | | | | Oct M + 1 |
| PDCP SDU 2 | | | | | | Oct M + SduLength1 = O |
| ... | | | | | | Oct O + 1 |
| ... | | | | | | Oct O + SduLength2 |
| PDCP SDU N | | | | | | Oct M + SumISdu Length O... N-1 ] = P |
| ... | | | | | | Oct P + 1 |
| | | | | | | Oct P + SduLength N |

UMD PDU with no SN for FI = 00 for N > 1

RLC UMD Header as per variant 3

| FI | R | R | R | R | R | R | R | |
|---|---|---|---|---|---|---|---|---|
| SN | | | | | | | | Oct 1 |
| SN | | | | | | | | Oct 2 |
| Num SDU | | | | | | | | Oct 3 |
| Length 1 | | | | | | | | Oct 4 |
| Length 1 | | | | | | | | Oct 5 |
| Length 2 | | | | | | | | Oct 6 |
| Length 2 | | | | | | | | Oct 7 |
| ... | | | | | | | | Oct 8 |
| ... | | | | | | | | Oct 9 |
| Length N | | | | | | | | Oct 4 + 2 * (N-2) |
| Length N | | | | | | | | Oct 4 + 2 * (N-2) + 1 |
| PDCP SDU 1 | | | | | | | | Oct 4 + 2 * (N-1) = M |
| ... | | | | | | | | Oct M + 1 |
| PDCP SDU 2 | | | | | | | | Oct M + SduLength1 = 0 |
| ... | | | | | | | | Oct O + 1 |
| ... | | | | | | | | Oct O + SduLength2 |
| PDCP SDU N | | | | | | | | Oct M + SumISdu Length 0... N-1] = P |
| ... | | | | | | | | Oct P + 1 |
| | | | | | | | | Oct P + SduLengt N |

UMD PDU with SN for FI != 00 for N > 1

FIG. 24

RLC Header as per variant 1

| D/C | P | RF | FI | SI | R | |
|---|---|---|---|---|---|---|
| | | | SN | | | Oct 1 |
| | | | SN | | | Oct 2 |
| | | | | | | Oct 3 |
| E | Length | | | | | Oct 4 |
| | Length | | | | | Oct 5 |
| | PDCP SDU 1 | | | | | Oct 6 |
| | ... | | | | | Oct 5 + SDU Length1 = L |
| E | Length | | | | | Oct L+1 |
| | Length | | | | | Oct L+2 |
| | PDCP SDU 2 | | | | | Oct L+3 |
| | ... | | | | | Oct L + 2 + SDU Length2 = M |
| | PDCP SDU 3 | | | | | Oct M+1 |
| | ... | | | | | Oct M + SDU Length3 |

RLC Header as per variant 3

| D/C | P | RF | FI | SI | R | |
|---|---|---|---|---|---|---|
| | | | SN | | | Oct 1 |
| | | | SN | | | Oct 2 |
| | | | | | | Oct 3 |
| NumSDUs | | | | | | Oct 4 |
| Length1 | | | | | | Oct 5 |
| Length1 | | | | | | Oct 6 |
| PDCP SDU1 | | | | | | Oct 7 .. Oct + SduLength = L |
| Length2 | | | | | | Oct L + 1 |
| Length2 | | | | | | Oct L + 2 |
| PDCP SDU2 | | | | | | Oct L + 3 ... Oct L + 2 + SduLength = M |
| ... | | | | | | Oct 4 + 2 * n−2 + sum of SduLength = N |
| Length N−1 | | | | | | Oct N + 1 |
| Length N−1 | | | | | | Oct N + 2 |
| PDCP SDU N−1 | | | | | | Oct L + 3 ... Oct N + 2 + SduLength = 0 |
| PDCP SDU N | | | | | | Oct 0 + 1... Oct 0 + SduLength |

AMD PDU with 16 bit SN with N > 1
Or
AMD PDU segment with 16 bit SN with No So with N > 1

FIG. 25

RLC UMD Header as per variant 1

| FI | E | Length | Length | PDCP SDU 1 | ... | Length | PDCP SDU 2 | ... | PDCP SDU 3 | ... | | | |
|---|---|---|---|---|---|---|---|---|---|---|---|---|---|
| FI | R | R | R | R | R | R | R | Oct 1 |
| E | | | | Length | | | | Oct 2 |
| | | | | Length | | | | Oct 3 |
| | | | | PDCP SDU 1 | | | | Oct 4 |
| | | | | ... | | | | Oct 3 + SDU Length1 = L |
| E | | | | Length | | | | Oct L + 1 |
| | | | | Length | | | | Oct L + 2 |
| | | | | PDCP SDU 2 | | | | Oct L + 3 |
| | | | | ... | | | | Oct L + 2 + SDU Length2 = M |
| | | | | PDCP SDU 3 | | | | Oct M + 1 |
| | | | | ... | | | | Oct M + SDU Length3 |

UMD PDU with no SN for FI = 00 for N > 1

RLC UMD Header as per variant 1

| FI | R | R | R | R | R | R | R | Oct 1 |
|---|---|---|---|---|---|---|---|---|
| | | | | SN | | | | Oct 2 |
| | | | | SN | | | | Oct 3 |
| E | | | | Length | | | | Oct 4 |
| | | | | Length | | | | Oct 5 |
| | | | | PDCP SDU 1 | | | | Oct 6 |
| | | | | ... | | | | Oct 5 + SDU Length1 = L |
| E | | | | Length | | | | Oct L + 1 |
| | | | | Length | | | | Oct L + 2 |
| | | | | PDCP SDU 2 | | | | Oct L + 3 |
| | | | | ... | | | | Oct L + 2 + SDU Length2 = M |
| | | | | PDCP SDU 3 | | | | Oct M + 3 |
| | | | | ... | | | | Oct M + 2 + SDU Length3 |

UMD PDU with SN for FI = 00 for N > 1

FIG. 29

| | | NR Cycles | | | | | | | Fast Packed ARQ | | | | | | |
|---|---|---|---|---|---|---|---|---|---|---|---|---|---|---|---|
| | | G:13686, S:1500, B:0 | | | G:13686, S:1500, B:10 | | | G:13686, S:1500, B:0 | | | G:13686, S:1500, B:10 | | |
| | | Cycles/SDU | Frequency | Total Cycles | Cycles/SDU | Frequency | Total Cycles | Cycles/SDU | Frequency | Total Cycles | Cycles/SDU | Frequency | Total Cycles |
| TX | TX Initial window check | 315 | 1000000 | 315000000 | 321 | 1000000 | 321000000 | 315 | 1000000 | 315000000 | 321 | 1000000 | 321000000 |
| | Window update, TX_NEXT | 545 | 1000000 | 545000000 | 561 | 1000000 | 561000000 | 545 | 1000000 | 545000000 | 561 | 1000000 | 561000000 |
| | TX Header Preparation | 92 | 1000000 | 92000000 | 97 | 1000000 | 97000000 | 92 | 1000000 | 92000000 | 97 | 1000000 | 97000000 |
| | Status parse + Retx Generation when no Segments | 1 | 890399 | 890399 | 321 | 890399 | 285818062 | 1 | 97589 | 97589 | 321 | 97589 | 31325960 |
| | Status parse + Retx Generation - With Segments | 31 | 219202 | 6795265 | 781 | 219202 | 171196843 | 31 | 219202 | 6795265 | 781 | 219202 | 171196843 |
| | Meta update after Status when no segments | 98 | 890399 | 87259097 | 110 | 890399 | 97943884 | 98 | 890399 | 87259097 | 110 | 890399 | 97943884 |
| | Meta update after Status - With segments | 536 | 219202 | 117492328 | 482 | 219202 | 105655414 | 536 | 219202 | 117492328 | 482 | 219202 | 105655414 |
| | | Average Cycles per SDU | | 1164 | Average Cycles per SDU | | 1640 | Average Cycles per SDU | | 1164 | Average Cycles per SDU | | 1385 |
| RX | Rx Header Parsing, no Segments | 180 | 890399 | 160271811 | 180 | 890399 | 160271811 | 180 | 890399 | 160271811 | 180 | 890399 | 160271811 |
| | Rx Header Parsing when segmented | 225 | 219202 | 49320473 | 225 | 219202 | 49320473 | 225 | 219202 | 49320473 | 225 | 219202 | 49320473 |
| | Rx window Update when no segments | 1181 | 890399 | 1051611157 | 1055 | 890399 | 939370890 | 1181 | 109601 | 129438843 | 1055 | 109601 | 115629110 |
| | Rx window Update when segmented | 2372 | 219202 | 519947391 | 1683 | 219202 | 368917142 | 2372 | 219202 | 519947391 | 1683 | 219202 | 368917142 |
| | Rx Segment Handler | 2215 | 219202 | 485532661 | 2105 | 219202 | 461420430 | 2215 | 219202 | 485532661 | 2105 | 219202 | 461420430 |
| | Rx Prohibit timer expiry - No Segments | 0 | 890399 | 320544 | 0.68 | 890399 | 605471 | 0 | 109601 | 39456 | 0.68 | 109601 | 74529 |
| | Rx Prohibit timer expiry - With Segments | 5 | 219202 | 1034634 | 4.3 | 219202 | 942569 | 5 | 219202 | 1034634 | 4.3 | 219202 | 942569 |
| | Rx Reassembly timer expiry - No Segments | 0 | 890399 | 0 | 26 | 890399 | 23150373 | 0 | 109601 | 0 | 26 | 109601 | 2849627 |
| | Rx Reassembly timer expiry - With Segments | 0 | 219202 | 0 | 133 | 219202 | 29153880 | 0 | 219202 | 0 | 133 | 219202 | 29153880 |
| | Rx Status build - No Segments | 20 | 890399 | 17807979 | 80 | 890399 | 71231916 | 20 | 109601 | 2192021 | 80 | 109601 | 8768084 |
| | Rx Status build - With Segments | 291 | 219202 | 63787812 | 301 | 219202 | 2210 | 291 | 219202 | 63787812 | 301 | 219202 | 1303 |
| | | Average Cycles per SDU | | 2350 | Average Cycles per SDU | | 2104 | Average Cycles per SDU | | 1412 | Average Cycles per SDU | | 1197 |

SYSTEM AND METHOD FOR CONCATENATION AND PREPROCESSING IN DATA PLANE

CROSS-REFERENCE TO RELATED APPLICATION(S)

This application is a continuation application, claiming priority under § 365(c), of an International application No. PCT/KR2021/007280, filed on Jun. 10, 2021, which is based on and claims the benefit of an Indian Provisional patent application number 202041024699, filed on Jun. 12, 2020, in the Indian Patent Office, and of an Indian Complete patent application number 202041024699, filed on Jun. 2, 2021, in the Indian Patent Office, the disclosure of each of which is incorporated by reference herein in its entirety.

BACKGROUND

1. Field

The disclosure relates to wireless communication networking. More particularly, the disclosure relates to a system and method for optimizing radio link control (RLC) mechanism in data plane.

2. Description of Related Art

Considering the development of wireless communication from generation to generation, the technologies have been developed mainly for services targeting humans, such as voice calls, multimedia services, and data services. Following the commercialization of 5th-generation (5G) communication systems, it is expected that the number of connected devices will exponentially grow. Increasingly, these will be connected to communication networks. Examples of connected things may include vehicles, robots, drones, home appliances, displays, smart sensors connected to various infrastructures, construction machines, and factory equipment. Mobile devices are expected to evolve in various form-factors, such as augmented reality glasses, virtual reality headsets, and hologram devices. In order to provide various services by connecting hundreds of billions of devices and things in the 6th-generation (6G) era, there have been ongoing efforts to develop improved 6G communication systems. For these reasons, 6G communication systems are referred to as beyond-5G systems.

6G communication systems, which are expected to be commercialized around 2030, will have a peak data rate of tera (1,000 giga) —level bps and a radio latency less than 100 microseconds (pee), and thus will be 50 times as fast as 5G communication systems and have the 1/10 radio latency thereof.

In order to accomplish such a high data rate and an ultra-low latency, it has been considered to implement 6G communication systems in a terahertz band (for example, 95 gigahertz (GHz) to 3 terahertz (THz) bands). It is expected that, due to severer path loss and atmospheric absorption in the terahertz bands than those in millimeter wave (mm-Wave) bands introduced in 5G, technologies capable of securing the signal transmission distance (that is, coverage) will become more crucial. It is necessary to develop, as major technologies for securing the coverage, radio frequency (RF) elements, antennas, novel waveforms having a better coverage than orthogonal frequency division multiplexing (OFDM), beamforming and massive multiple input multiple output (MIMO), full dimensional MIMO (FD-MIMO), array antennas, and multiantenna transmission technologies such as large-scale antennas. In addition, there has been ongoing discussion on new technologies for improving the coverage of terahertz-band signals, such as metamaterial-based lenses and antennas, orbital angular momentum (OAM), and reconfigurable intelligent surface (RIS).

Moreover, in order to improve the spectral efficiency and the overall network performances, the following technologies have been developed for 6G communication systems: a full-duplex technology for allowing an uplink transmission and a downlink transmission to simultaneously use the same frequency resource at the same time; a network technology for utilizing satellites, high-altitude platform stations (HAPS), and the like in an integrated manner; an improved network structure for supporting mobile base stations and the like and allowing network operation optimization and automation and the like; a dynamic spectrum sharing technology via collision avoidance based on a prediction of spectrum usage; an use of artificial intelligence (AI) in wireless communication for improvement of overall network operation by utilizing AI from a designing phase for developing 6G and internalizing end-to-end AI support functions; and a next-generation distributed computing technology for overcoming the limit of a user equipment (UE) computing ability through reachable super-high-performance communication and computing resources (such as mobile edge computing (MEC), clouds, and the like) over the network. In addition, through designing new protocols to be used in 6G communication systems, developing mechanisms for implementing a hardware-based security environment and safe use of data, and developing technologies for maintaining privacy, attempts to strengthen the connectivity between devices, optimize the network, promote softwarization of network entities, and increase the openness of wireless communications are continuing.

It is expected that research and development of 6G communication systems in hyper-connectivity, including person to machine (P2M) as well as machine to machine (M2M), will allow the next hyper-connected experience. Particularly, it is expected that services such as truly immersive extended reality (XR), high-fidelity mobile hologram, and digital replica could be provided through 6G communication systems. In addition, services such as remote surgery for security and reliability enhancement, industrial automation, and emergency response will be provided through the 6G communication system such that the technologies could be applied in various fields such as industry, medical care, automobiles, and home appliances.

Recently, various researches on radio link control (RLC) mechanism for optimizing overhead for RLC header processing have been studied for a next generation communication system.

The above information is presented as background information only to assist with an understanding of the disclosure. No determination has been made, and no assertion is made, as to whether any of the above might be applicable as prior art with regard to the disclosure.

SUMMARY

With the advent of further increase in data demand, high bandwidth, processing capability, it is very much viable that a future modem communication protocol system, particularly in system beyond 5G/6G, would be having a huge requirement for high-speed data processing. With an increased number of packets to be processed in a shortened Transmission Time Interval (TTI), there is a need to improve the data plane processing capability in various aspects to achieve extremely fast processing. Recently, there have been many approaches to improving multi core architecture designs. However, the current state of the art techniques need to be simplified and the overhead of processing functionalities quickened for future generation protocols by providing a reliable communication mechanism for the application and transport layers as well.

To achieve the aforementioned requirements, a communication protocol for modem should provide at least, for example, a highly efficient way of packing information, minimal overhead in terms of processing, light functionalities, scalable solutions, and reliable mechanism for service to upper layers.

Thus, there is a need to define a new next generation RLC mechanism to address at least one such aspect for optimizing overhead for RLC header processing.

Aspects of the disclosure are to address at least the above-mentioned problems and/or disadvantages and to provide at least the advantages described below. Accordingly, an aspect of the disclosure is to provide a system and a method for transmitting data. In this method, a Radio Link Control (RLC) layer receives a plurality of Protocol Data Unit (PDU) packets from a Packet Data Convergence Protocol (PDCP) layer and preprocess an RLC sub header of an RLC header of each received PDU packet based on a service data unit (SDU) length received from the PDCP layer. The RLC layer performs concatenation one complete PDCP PDU packet into an RLC PDU along with an RLC sub header length information based on an available Medium Access Control (MAC) grants and then segments the PDU packets into a new PDCP PDU packet which is truncated due to less available MAC grants. Further, the method prepares an RLC PDU along with an RLC header comprising the concatenated at least one complete PDCP PDU packet and at the most one new PDCP PDU packet and transmits the RLC PDU.

Additional aspects will be set forth in part in the description which follows and, in part, will be apparent from the description, or may be learned by practice of the presented embodiments.

In accordance with an aspect of the disclosure, a method for transmitting data for an established radio link between a user equipment (UE) and a network node is provided. The method includes receiving, by a Radio Link Control (RLC) layer, a plurality of Protocol Data Unit (PDU) packets from a Packet Data Convergence Protocol (PDCP) layer, pre-processing, by the RLC layer, an RLC sub header of a RLC header of each received PDU packet based on a service data unit (SDU) length which is received from the PDCP layer for each of the plurality of the PDU packets, concatenation, by the RLC layer, at least one complete PDCP PDU packet from the received plurality of the PDU packets into an RLC PDU along with a RLC sub header length information based on an available Medium Access Control (MAC) grants, segmenting, by the RLC layer, the plurality of Protocol Data Unit (PDU) packets into a new PDCP PDU packet which is truncated due to less available MAC grants, preparing an RLC PDU along with the RLC header comprising the concatenated at least one complete PDCP PDU packet and at the most one new PDCP PDU packet getting segmented based on the available MAC grants, and transmitting, by the RLC layer to lower (MAC) layer, the RLC PDU.

In accordance with another aspect of the disclosure, an apparatus for transmitting data for an established radio link between a UE and a network node is provided. The apparatus includes a transceiver configured to transmit and receive a signal, and a controller coupled with the transceiver and configured to receive, by a Radio Link Control (RLC) layer, a plurality of Protocol Data Unit (PDU) packets from a Packet Data Convergence Protocol (PDCP) layer, pre-process, by the RLC layer, an RLC sub header of a RLC header of each received PDU packet based on a service data unit (SDU) length which is received from the PDCP layer for each of the plurality of the PDU packets, concatenate by the RLC layer, at least one complete PDCP PDU packet from the received plurality of the PDU packets into an RLC PDU along with a RLC sub header length information based on an available Medium Access Control (MAC) grants, segment, by the RLC layer, the plurality of Protocol Data Unit (PDU) packets into a new PDCP PDU packet which is truncated due to less available MAC grants, prepare an RLC PDU along with the RLC header comprising the concatenated at least one complete PDCP PDU packet and at the most one new PDCP PDU packet getting segmented based on the available MAC grants, and transmit, by the RLC layer to lower (MAC) layer, the RLC PDU.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 6 illustrates a basic RLC header(s) structure in NR (5G) according to an embodiment of the disclosure;

FIG. 13 illustrates unacknowledged mode data (UMD) PDU Header structure in variant 1, according to an embodiment of the disclosure;

FIG. 14 illustrates yet another variant 3 of Next Generation RLC Header, according to an embodiment of the disclosure;

FIG. 15 illustrates UMD PDU Headers as per variant 3, according to an embodiment of the disclosure;

FIG. 17 illustrates a further embodiment as per variant 1/variant 3 of Next Generation RLC Header with Packed Length Sub-Header, according to an embodiment of the disclosure;

FIG. 19 illustrates yet another embodiment of UMD PDU Header with Packed Length Sub-Header as per variant 3, according to an embodiment of the disclosure;

FIG. 23 illustrates yet another embodiment of UMD PDU Header as per variant 3 with Packed Length Sub-Header without Last SDU Length, according to an embodiment of the disclosure;

FIG. 24 illustrates another embodiment of Next Generation RLC header as per variant 1/variant 3 with Distributed Length Sub-Header without Last SDU Length, according to an embodiment of the disclosure;

FIG. 25 illustrates yet another embodiment of RLC UMD PDU Header as per variant 1 with Distributed Length Sub-Header without Last SDU Length, according to an embodiment of the disclosure;

FIG. 29 illustrates benefits of Next Generation data plane over state of the art, according to an embodiment of the disclosure;

Throughout the drawings, it should be noted that like reference numbers are used to depict the same or similar elements, features, and structures.

DETAILED DESCRIPTION

Figure 1:
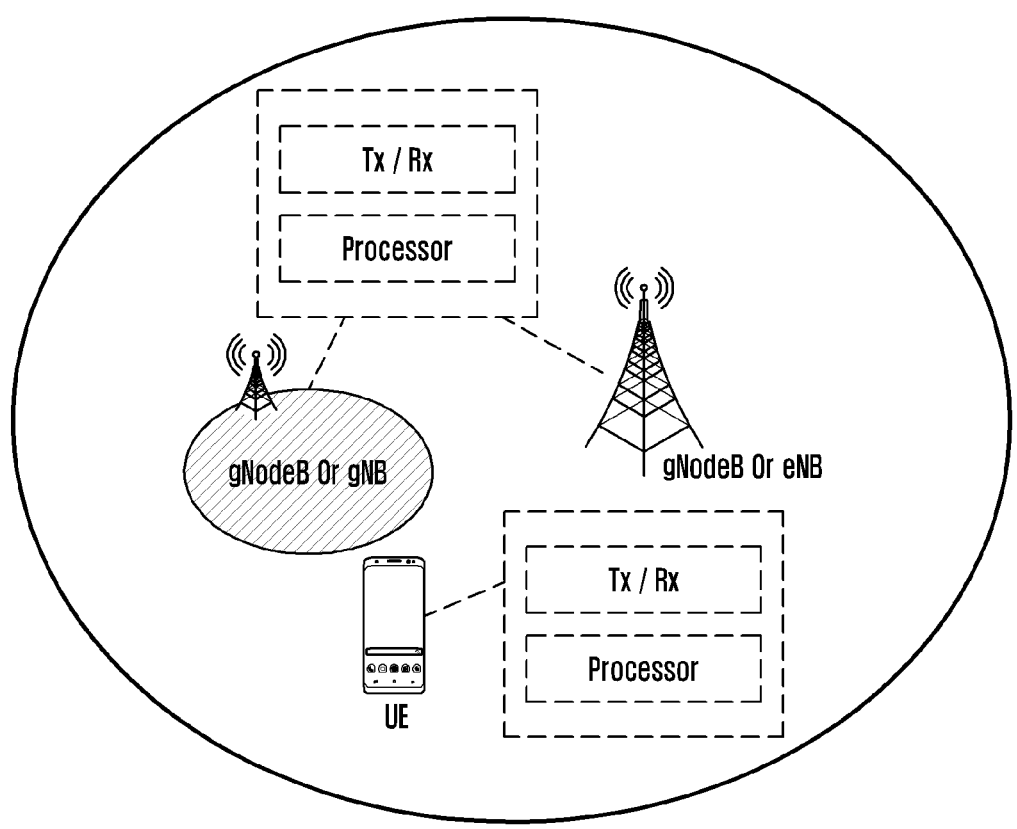
FIG. 1 illustrates a scenario of a wireless communication system operating in fourth generation (4G) of wireless communication technology, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that the various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Reference throughout this specification to "an aspect," "another aspect" or similar language denotes that a particular feature, structure, or characteristic described in connection with the embodiment is included in at least one embodiment of the disclosure. Thus, appearances of the phrase "in an embodiment," "in another embodiment" and similar language throughout this specification may, but do not necessarily, all refer to the same embodiment.

The terms "comprises," "comprising," or any other variations thereof, are intended to cover a non-exclusive inclusion, such that a process or method that comprises a list of operations does not include only those operations but may include other operations not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

In recent years, several broadband wireless technologies have been developed to meet the growing number of broadband subscribers for providing better applications and services. Second generation wireless communication system has been developed to provide voice services while ensuring the mobility of users. Third generation wireless communication system supports not only the voice service but also data service. In recent years, fourth generation (4G) wireless communication system has been developed to provide high-speed data service.

FIG. 1 illustrates a scenario of a wireless communication system operating in fourth generation of wireless communication technology according to an embodiment of the disclosure.

However, currently, the fourth generation (4G) wireless communication system suffers from a lack of resources to meet the growing demand for high-speed data services. This problem is solved by the deployment of fifth generation wireless communication system to meet the ever-growing demand for high-speed data services. Furthermore, the fifth generation (5G) wireless communication system provides ultra-reliability and supports low latency applications.

With the advent of further increase in data demand, high bandwidth, processing capability, the next generation wireless communication systems i.e., 6G and beyond generation should be capable to meet such ever-increasing requirements. For doing so the communication protocol should be capable of processing high speed data. In LTE the protocols that exists for user plane includes Packet Data Convergence Protocol (PDCP), Radio Link Control (RLC), Medium Access Control (MAC), and the PHY protocol. The control plane stack additionally includes the radio resource control (RRC) and non-access stratum (NAS).

The RLC protocol layer exists in UE and eNodeb, it is a part of LTE air interface control and data planes.

Figure 2:
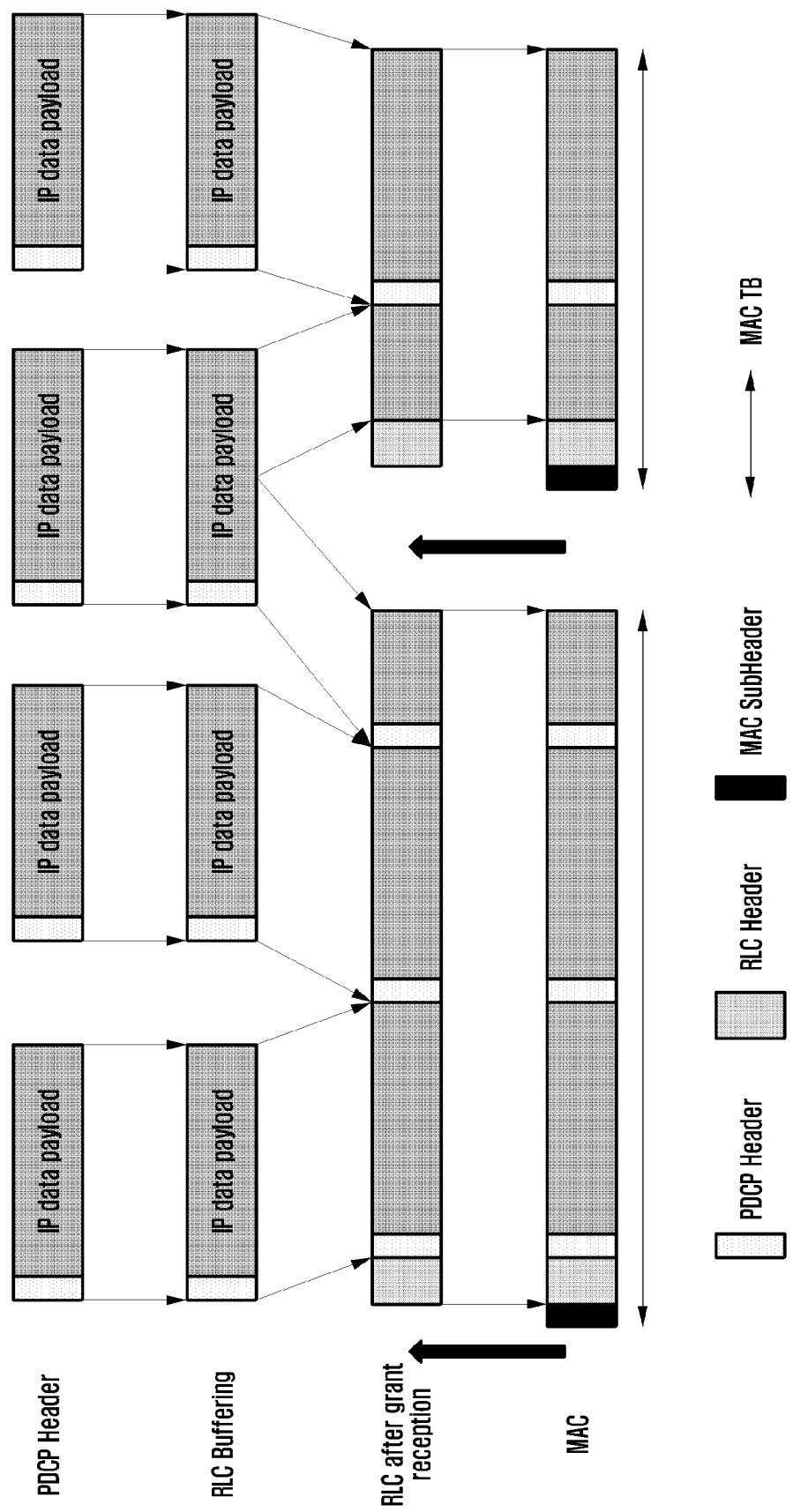
FIG. 2 illustrates an example of Data Plane in long term evolution (LTE) (4G) according to an embodiment of the disclosure.

FIG. 2 illustrates an example of Data Plane in LTE (4G) according to an embodiment of the disclosure.

Figure 3:
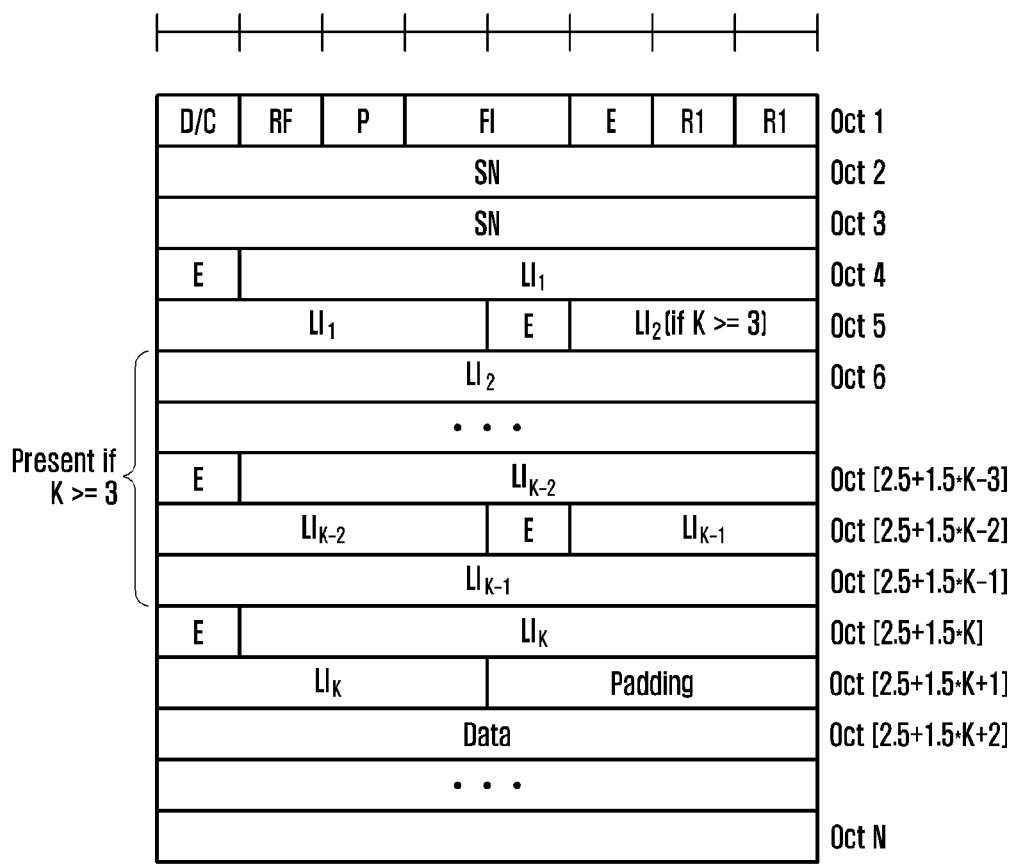
FIG. 3 illustrates a basic RLC header(s) structure in LTE (4G) according to an embodiment of the disclosure.

FIG. 3 illustrates a basic RLC header(s) structure in LTE (4G) according to an embodiment of the disclosure.

Figure 4:
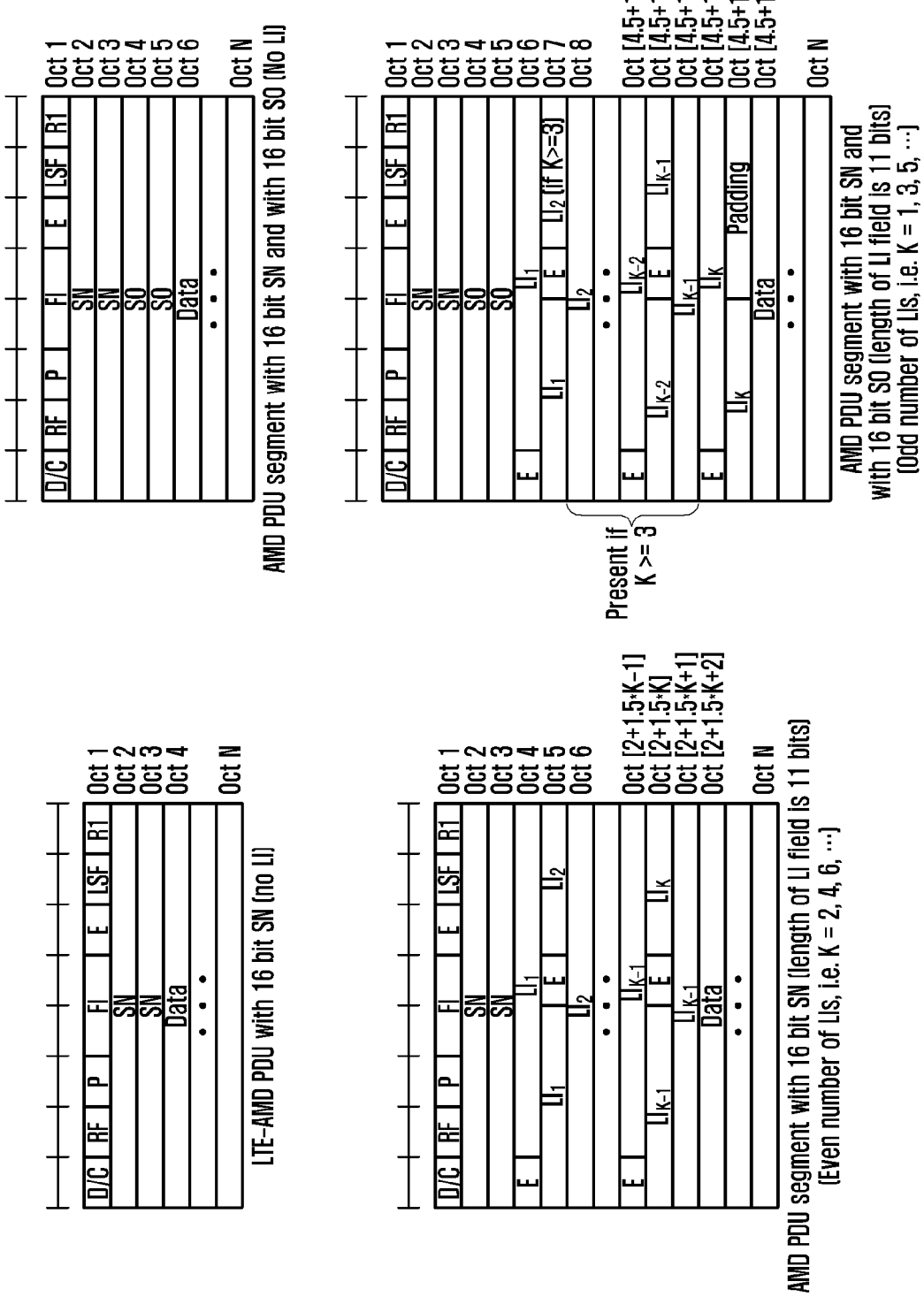
FIG. 4 illustrates various examples of RLC header(s) structure in LTE (4G) according to an embodiment of the disclosure.

FIG. 4 illustrates various examples of RLC header(s) structure in LTE (4G) according to an embodiment of the disclosure.

Furthermore, there are different types of RLC Headers for different RLC Sequence Number (SN) Lengths however as an example only four type has been shown in the FIG. 4. The main functionalities of the RLC for LTE (4G) are:
   Error correction mechanism through automatic repeat request (ARQ);
   In-order delivery mechanism;
   Concatenation mechanism;
   Segmentation & Reassembly mechanism; and
   Reordering mechanism.

According to the 4G mechanism, when RLC receives grants from lower layer, transmitter entity concatenates multiple PDCP PDUs into an RLC Protocol Data Unit (PDU) and assigns one RLC SN for an RLC PDU.

Referring to FIG. 3, FI indicates Framing Info field. The Framing Info field is updated to inform whether the first byte and the last byte of the RLC PDU corresponds to the first byte and the last byte of an RLC SDU, respectively.

E indicates Extension Field. The Extension Field indicates whether a Data field follows to indicate the end of the header or another extension follows or not i.e., a set of E field and LI field follows.

LI indicates Length Indicator Field. The Length Indicator Field indicates the length of the RLC SDU.

In 4G, E and LI field is not updated for the last concatenated PDCP PDU. Further, according to the FIG. 2, a complete RLC SN prepared only after reception of grant.

In LTE (4G) single RLC SN is assigned when grants are available from MAC and single RLC SN maps to multiple PDCP PDUs because of concatenation. Hence, a number of RLC SN required are less even for a larger number of PDCP PDU packets when the size of the PDCP PDU is smaller than the available grants. If RLC PDU(s) are lost for the first time because of BLER, the Status Report generated only needs to report completely missed RLC SNs. Now, when an NACKed RLC SN is retransmitted in case of fewer grants available, an acknowledgment mode data (AMD) PDU segment is sent which is indicated using Re-segmentation Flag (RF) in the header. Thus, the advantageous factor in LTE (4G) RLC Header is the requirement of less number of RLC SN than the PDCP SN.

However, the RLC header in LTE give rise to various issues, for example, but not limited to, multiple header types lead to variable size of RLC header. As the number of PDCP PDUs to be packed cannot be known before a complete RLC header can be prepared only after receiving grants. Hence, LI field in the RLC Header structure can be updated only after grant.

In case of re-segmentation in case of retransmission of an NACKed RLC SN, the RLC Header needs to be updated to include the RF, LSF and SO field and re-fill the LI information based on the number of PDCP PDUs getting concatenated during re-segmentation. The length of the last PDCP PDU included in the concatenated RLC PDU has to be computed by subtracting RLC PDU LI fields for other PDCP PDUs from the total MAC PDU Length.

Thus, it can be gathered that LTE (4G) RLC Header yields the aforementioned problems by having a variable size RLC Header and no pre-processing of RLC.

Figure 5:
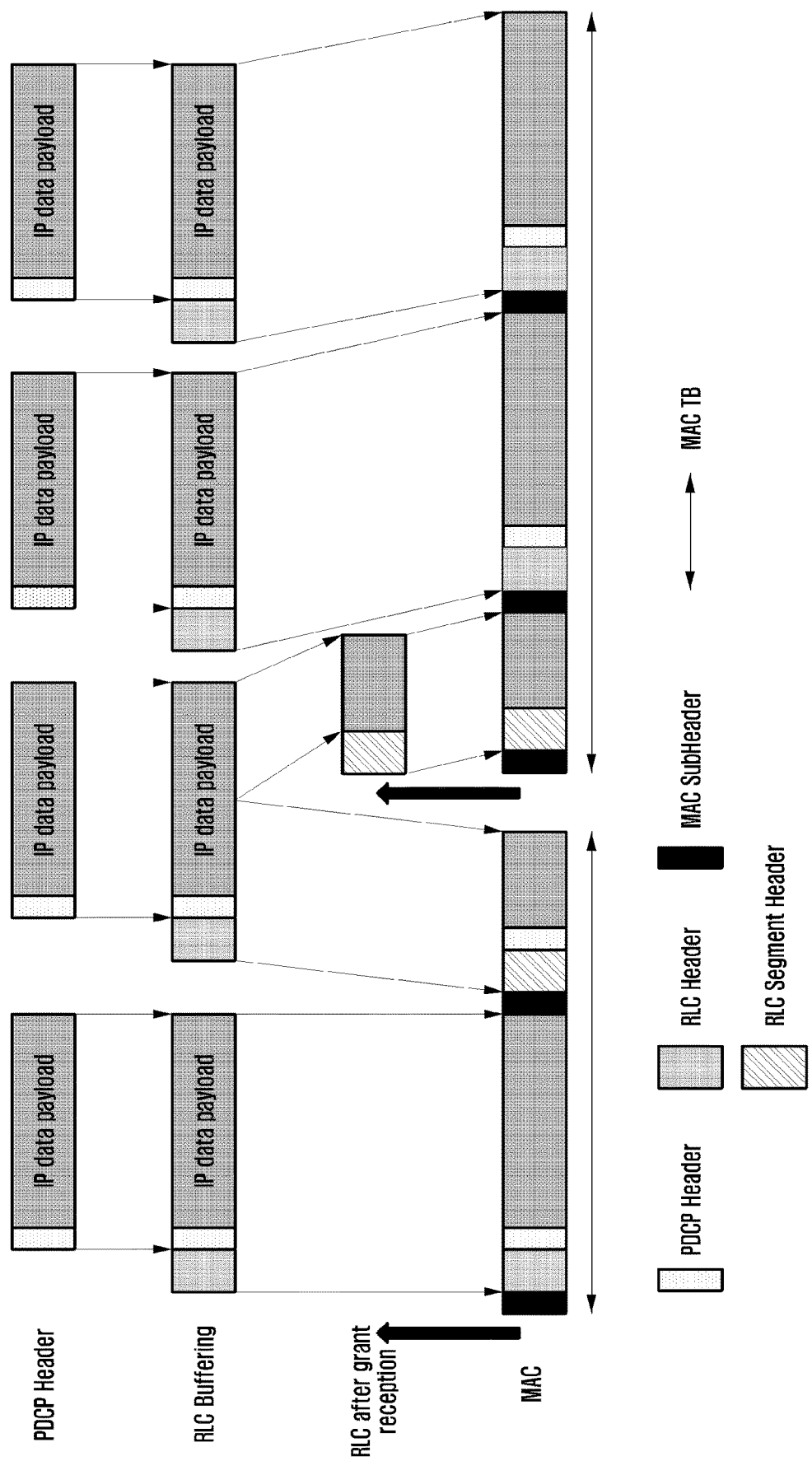
FIG. 5 illustrates an example of Data Plane in new radio (NR) (5G) according to an embodiment of the disclosure.

FIG. 5 illustrates an example of Data Plane in NR (5G) according to an embodiment of the disclosure.

FIG. 6 illustrates a basic RLC header(s) structure in NR (5G) according to an embodiment of the disclosure.

The main functionalities of the RLC for NR (5G) are:
   Error correction mechanism through ARQ;
   In-order delivery mechanism;
   Segmentation & Reassembly mechanism; and
   Reordering mechanism.

Thus, RLC for NR (5G) lack a concatenation mechanism. Thus, without concatenation mechanism, single RLC SN maps to single RLC SDU i.e., one PDCP PDU, and hence, this is extremely advantageous in terms of pre-processing.

Referring to FIG. 6, SI indicates Segmentation Info Field. The Segmentation Info Field indicates whether an RLC PDU contains a complete RLC SDU or the first, middle, last segment of an RLC SDU.

SO indicates Segmentation Offset Field. The Segmentation Offset Field indicates the position of the RLC SDU segment in bytes within the original RLC SDU. In case of Segmentation, in case of no grants, for the first segment, SI field is enough to indicate the first segment as SO=0 is redundant.

The advantages of the NR (5G) RLC Header can be listed as:
   NR (5G) RLC header is of fixed size;
   Single RLC SN is assigned to a single PDCP PDU; and
   RLC Header can be prepared even before grant update operation.

Segmentation Information can be easily filled without much changes to the already pre-processed RLC complete PDU Header as only SI bit needs to be updated for the first Segment to be transferred.

During segmentation or re-segmentation, RLC has just to prepare an RLC Segment Header with the SO field. Thus, it can be gathered that NR (5G) RLC Header provides at least a fixed size RLC Header, already pre-processed RLC and efficient segment information.

On the other hand, NR (5G) RLC Header yields various issues such as:

In NR (5G) RLC mechanism, large number of RLC SN is required for window maintenance as single RLC SN gets mapped to single PDCP SN. Further, the processing cycle at the receiver end increases due to extra sequence numbers.

For every grant, MAC has to prepare multiple MAC Sub Headers, as MAC Sub Header capture the Length of the RLC PDU information.

Length of each RLC PDU or RLC PDU Segment is packed with MAC Sub-Header.

Further, with the advent of further increase in data demand, high bandwidth, processing capability, it is very much viable that a future modem communication protocol system, particularly in a system beyond 5G/6G, would be having a huge requirement for high-speed data processing. With an increased number of packets to be processed in a shortened Transmission Time Interval (TTI), there is a need to improve the data plane processing capability in various aspects to achieve extremely fast processing. Recently, there have been many approaches to improving multi core architecture designs. However, the current state of the art techniques needs to be simplified and the overhead of processing functionalities quickened for future generation protocol by providing a reliable communication mechanism for the application and transport layers as well.

To achieve the aforementioned requirements, a communication protocol for modem should provide at least, for example, a highly efficient way of packing information, minimal overhead in terms of processing, light functionalities, scalable solutions, and reliable mechanism for service to upper layers.

Thus, there is a need to define a new next generation RLC mechanism to address at least one such aspect for optimizing overhead for RLC header processing.

The disclosure provides a system and method for optimizing overheads in RLC header processing by limiting the number of headers and fixed header. In order to reduce the number of RLC SN and to introduce fixed size of RLC Header, the following mechanism is re-introduced in the RLC mechanism for Next Generation system (beyond 5G/6G systems):

Concatenation mechanism at RLC;
RLC Sub-Header for Length of PDCP PDU for allowing pre-processing; and
One RLC PDU for one grant indication from MAC transport block (TB).

The disclosure may be implemented effectively by using Hardware Accelerators (HWA) for header parsing. Segmentation handling remains same as NR. The various variants of RLC header structure and procedure for transmission at various modes are explained in detail below.

According to an embodiment of the disclosure, a method for transmitting data for an established radio link between a UE and a network node by configuring a Radio Link Control (RLC) layer to receive a plurality of Protocol Data Unit (PDU) packets from a Packet Data Convergence Protocol (PDCP) layer is disclosed. Thereafter, RLC layer preprocess the RLC sub header of a RLC header of each received PDU packet based on a RLC sub header length information. The RLC layer further concatenation the complete PDCP PDU packet from the received plurality of the PDU packets into an RLC PDU along with the RLC sub header length information based on an available Medium Access Control (MAC) grants. Thereafter, RLC Sequence Number (SN) is assigned to the concatenated at least one complete PDCP PDU packet. Further method includes segmenting, by the RLC layer, the plurality of Protocol Data Unit (PDU) packets into second PDCP PDU packet which is truncated due to less available MAC grants. Further, a new RLC Sequence Number (SN) is assigned to the segmented second PDCP PDU packet and preparing an RLC PDU along with the RLC header comprising the concatenated at least one complete first PDCP PDU packet and at the most the segmented one second PDCP PDU packet based on the available MAC grants. Further, the RLC layer transmitting to a lower (MAC) layer, the RLC PDU.

Figure 7:
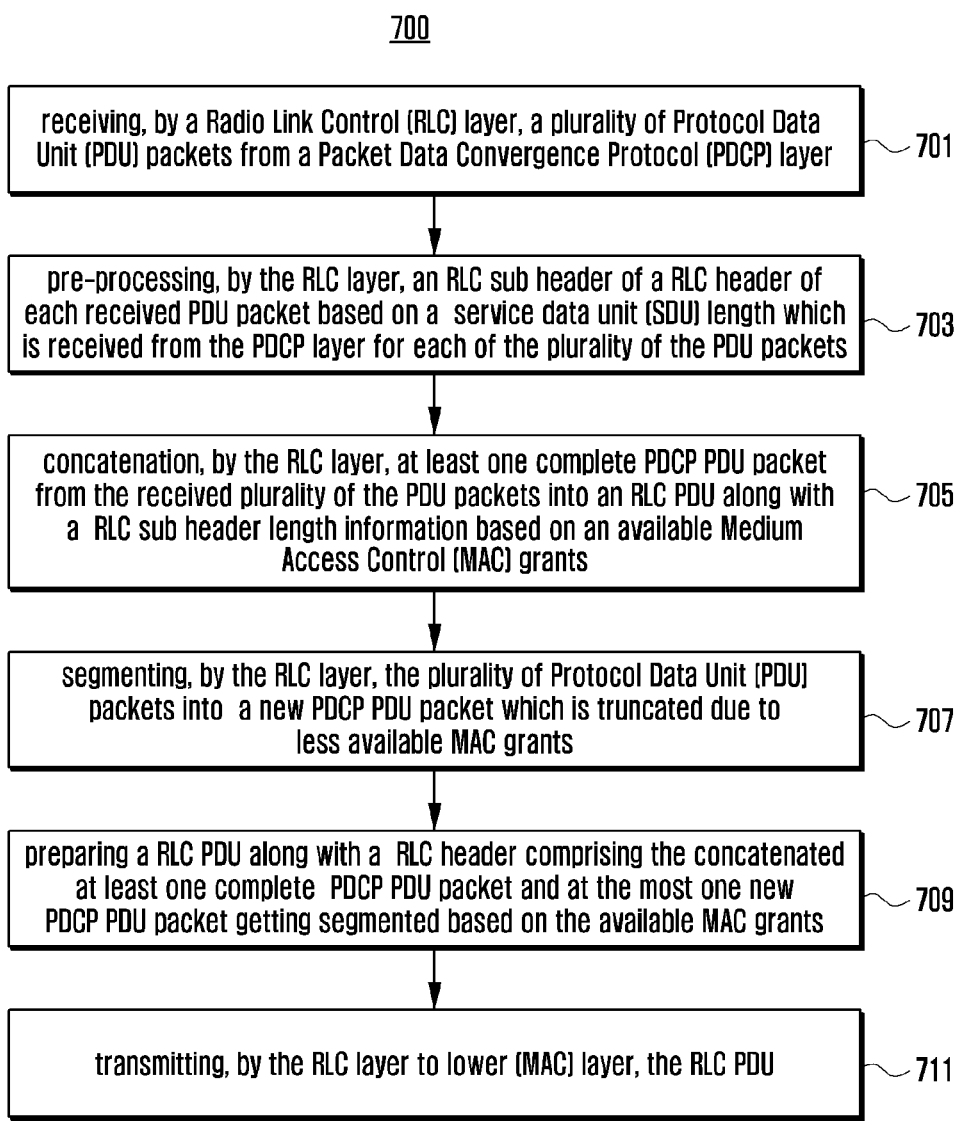
FIG. 7 illustrates a flow chart for method for concatenation and preprocessing data plane by configuring RLC layer, according to an embodiment of the disclosure.

FIG. 7 illustrates a flow chart for method for concatenation and preprocessing data plane by configuring RLC layer, according to an embodiment of the disclosure.

Referring to FIG. 7, in an implementation the method 700 may be implemented at a transmitter entity or at a receiver entity. The transmitter entity or the receiver entity may be reside at the network side or at a user equipment (UE).

At operation 701, the method 700 comprises, receiving, by a Radio Link Control (RLC) layer, a plurality of Protocol Data Unit (PDU) packets from a Packet Data Convergence Protocol (PDCP) layer. In an implementation, the RLC layer is further configured to receive the available grants from the MAC layer. The RLC header may be of a pre-determined fixed size.

At operation 703, the method 700 comprises, pre-processing, by the RLC layer, an RLC sub header of an RLC header of each received PDU packets based on a service data unit (SDU) length which is received from the PDCP layer for each of the plurality of the PDU packets.

Thereafter, at operation 705, the method 700 comprises concatenating, by the RLC layer, at least one complete PDCP PDU packet from the received plurality of the PDU packets into an RLC PDU along with an RLC sub header length information based on available Medium Access Control (MAC) grants.

After concatenation at the operation 705, at operation 707, the method 700 includes segmenting, by the RLC layer, the plurality of Protocol Data Unit (PDU) packets into a new PDCP PDU packet which is truncated due to less available MAC grants. In an implementation, the method 700, further includes assigning a first RLC Sequence Number (SN) to the concatenated at least one complete PDCP PDU packet and assigning a new RLC Sequence Number (SN) to the new PDCP PDU packet.

Subsequently, at operation 709, the method 700 comprises, preparing an RLC PDU along with the RLC header comprising the concatenated at least one complete PDCP PDU packet and at the most one new PDCP PDU packet getting segmented based on the available MAC grants. In an implementation, the preparation of the RLC PDU comprising determining, by the RLC layer, if the received available grants is sufficient to include the at least one complete PDCP PDU packet. Thereafter, based on the available grant and available PDCP PDUs, RLC layer splits the plurality of Protocol Data Unit (PDU) packets into the at least one complete PDCP PDU packet and the new PDCP PDU packet. As an example, the new RLC Sequence Number (SN) is assigned to the new PDCP PDU packet and is different from the assigned first RLC Sequence Number (SN) to the concatenated at least one complete PDCP PDU packet. Further, a new RLC header of the new PDCP PDU packet includes only the Sequence Number (SN) without including the RLC Sub header length information. Thereafter, the RLC PDU is prepared by accommodating the segmented new PDCP PDU packet with the at least one complete PDCP PDU packet based on the available MAC grants.

Thus, after preparing of the RLC PDU at operation 709, the RLC PDU was transmitted by the RLC layer to the lower (MAC) layer at operation 711. Now, if the received available grants and the PDCP PDUs are not sufficient then the RLC PDU is prepared with the at least one complete PDCP PDU packet. Thus, the RLC PDU is transmitted with the at least one complete PDCP PDU packet. Thus, the mechanism may be defined as fast packed ARQ.

In a further implementation, the method 700 includes transmitting, in a subsequent PDUs, a remaining part of the segmented new PDCP PDU packet that is unaccommodated in the RLC PDU with the assigned new RLC Sequence Number (SN) in a next MAC grant transmission cycle. As an example, the at least one complete PDCP PDU packet are defined as a PDCP PDU packets that can be completely transmitted and the new PDCP PDU packet are defined as a PDCP PDU packets that cannot be completely transmitted according to the available MAC grants.

In a yet further implementation, the method 700 includes receiving available MAC grants, by the RLC layer, for a next MAC grant transmission cycle. As an example, the available MAC grants in this operation is received for the next MAC grant transmission cycle. Thereafter, determining, by the RLC layer, if the received available grants is sufficient to include the at least one first complete PDCP PDU packet from the remaining part of the segmented new PDCP PDU packets. Subsequently, the method 700 splits the remaining part of the segmented new PDCP PDU packets into the at least one first complete PDCP PDU packet and the second new PDCP PDU packet based on the received available grants and available PDCP PDUs. Here, the new RLC Sequence Number (SN) is assigned to the at least one first complete PDCP PDU packet. Thereafter, the method includes assigning another new RLC Sequence Number (SN) to the second new PDCP PDU packet that is different from the new RLC Sequence Number (SN). Accordingly, a new RLC header of the second new PDCP PDU packet includes only the other new RLC Sequence Number (SN) without including the RLC Sub header length information. The method further includes preparing the RLC PDU by accommodating the at least one first complete PDCP PDU packet and the second new PDCP PDU packet based on the available MAC grants. Further, a remaining part of the second new PDCP PDU packet is transmitted in a next or upcoming MAC grant transmission cycle.

In a yet further implementation, the method 700 includes receiving an unsuccessful acknowledge message associated with a failure in transmission of the RLC PDU from a receiver entity. Thereafter, the method 700 includes performing retransmitting the RLC PDU to the MAC layer based on the reception of an unsuccessful acknowledge in a next transmission cycle. In particular, a newly available MAC grants is being received, by the RLC layer, from the MAC layer, in the next transmission cycle. Thereafter, determining a sufficiency of the newly available grants to retransmit the RLC PDU in the next transmission cycle and thereafter retransmits, by the RLC layer to the MAC layer, the RLC PDU along with the RLC header which is similar to the failed transmitted RLC PDU based on the determination of sufficiency of the newly available MAC grants.

According to the further implementation, the method 700 further includes determining, by the RLC layer, if the newly received available MAC grants is insufficient to retransmit the RLC PDU with the newly received available grants. Thus, based on the determination of the newly received available grants the RLC PDU is further re-segmented. The re-segmentation corresponds to the segmentation of the plurality of Protocol Data Unit (PDU) packets into at least two RLC PDU packets which is truncated due to less availability of the newly received available MAC grants.

Figure 8:
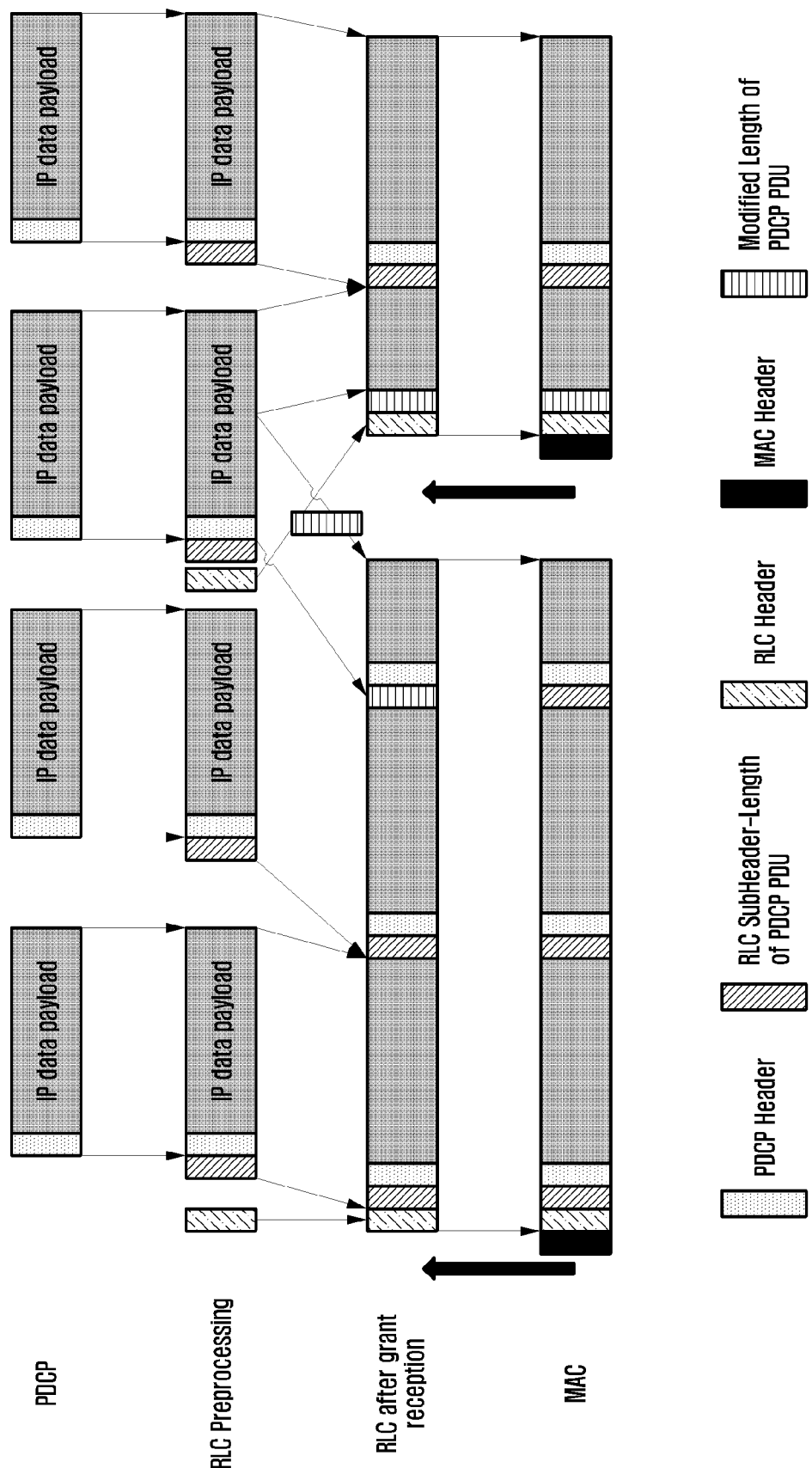
FIG. 8 illustrates a variant 1 of data plane for Next Generation system, according to an embodiment of the disclosure.

FIG. 8 illustrates a variant 1 of data plane for Next Generation system, according to an embodiment of the disclosure.

In one implementation of the data plane for Next Generation system, an RLC Sub-Header for Length of PDCP PDU may not be allowed to get fragmented and some PDCP PDU may exist i.e., while fragmentation. Further, a length of PDCP PDU may be at least 1 byte. The structure of the Next Generation RLC Header structure will be explained in detail in the forthcoming paragraph.

Figure 9:
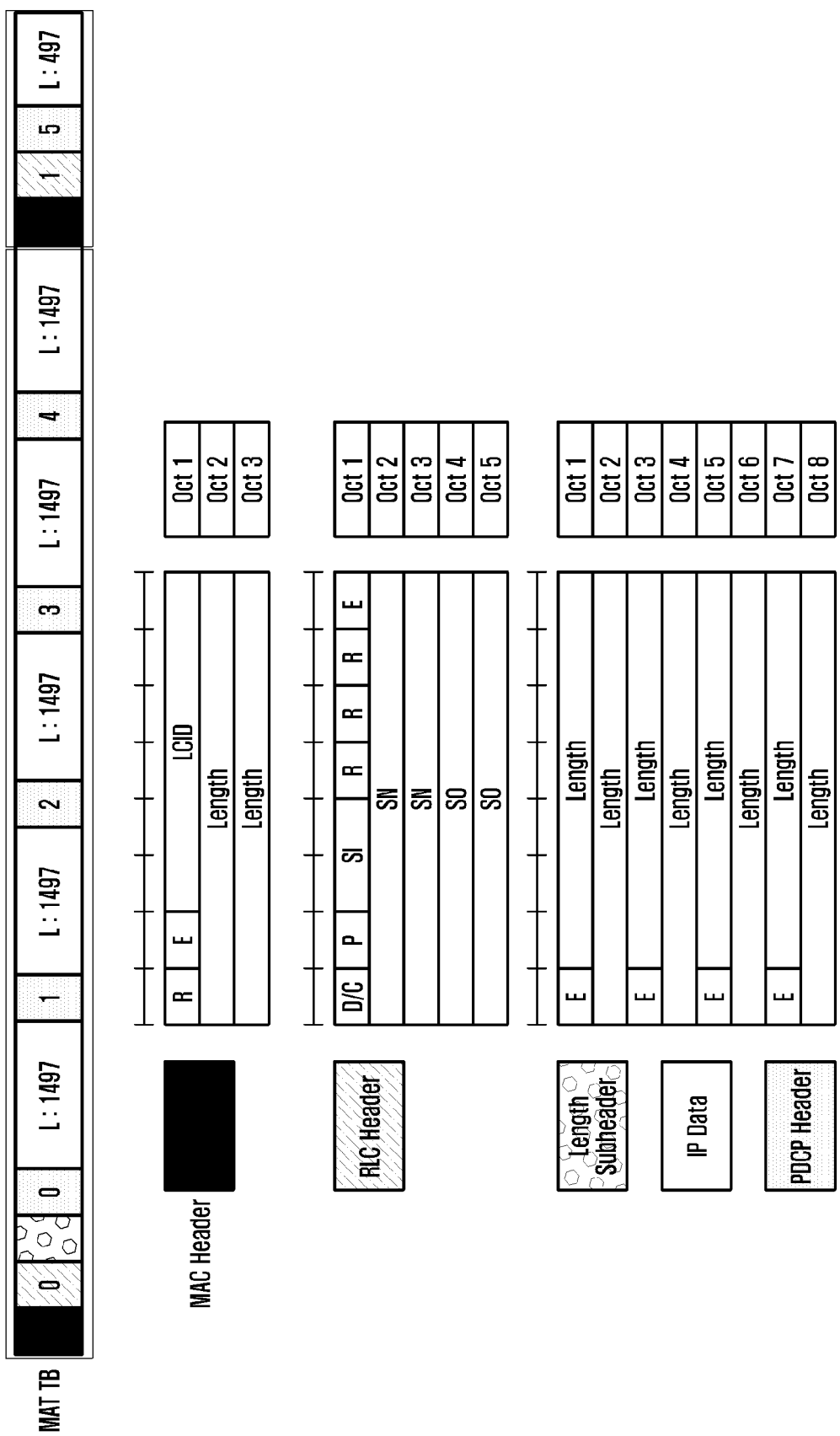
FIG. 9 illustrates a variant 1 of the RLC header, according to an embodiment of the disclosure.

FIG. 9 illustrates a variant 1 of the RLC header, according to an embodiment of the disclosure.

According to the disclosure, a single RLC SN is assigned to the RLC SDUs which can be completely transmitted according to the operation 707 of the FIG. 7. Length of individual RLC SDUs in a concatenated RLC PDU is indicated using RLC Length Sub Header. Further, a separate RLC SN is assigned for the RLC SDU which gets segmented according to operations 705 and 707. Segment information is indicated using SI, SO fields same as in NR. Each RLC PDU has an accompanying MAC Sub-Header containing total length of RLC PDU. Length of last SDU is not included in the Length Sub-Header. According to the FIG. 9, the PDCP PDUs are delivered to lower layer at RLC. RLC Complete PDU has a fixed header size for SN length (24 bits in this sample example) which can be prepared for all the SNs before.

The RLC Header as shown in the FIG. 9 includes:

Data/Control (D/C) bit (Data: 1 and Control: 0);

Poll bit (P bit);

Segmentation Info (SI) (2 bits) —Used only for PDU Segment;

Extension bit (E bit) (1 bit) —to indicate whether a RLC Length Sub-Header exists. (1: Yes, 0: No); and Sequence Number (SN) (16 bits) (sample).

Each PDCP PDU is corresponding to a RLC Sub-Header for Length field when PDCP PDUs get concatenated into a single RLC PDU.

E bit (Extension bit) 1—a set of E, Length 0—this is the last PDCP PDU portion in the RLC PDU.

Length (15 bits) —Length of PDCP PDU updated for the corresponding PDCP PDUs. (sample).

MAC Header contains logical channel ID (LCID) and total Length of RLC PDU. (same as in NR).

Figure 10A:
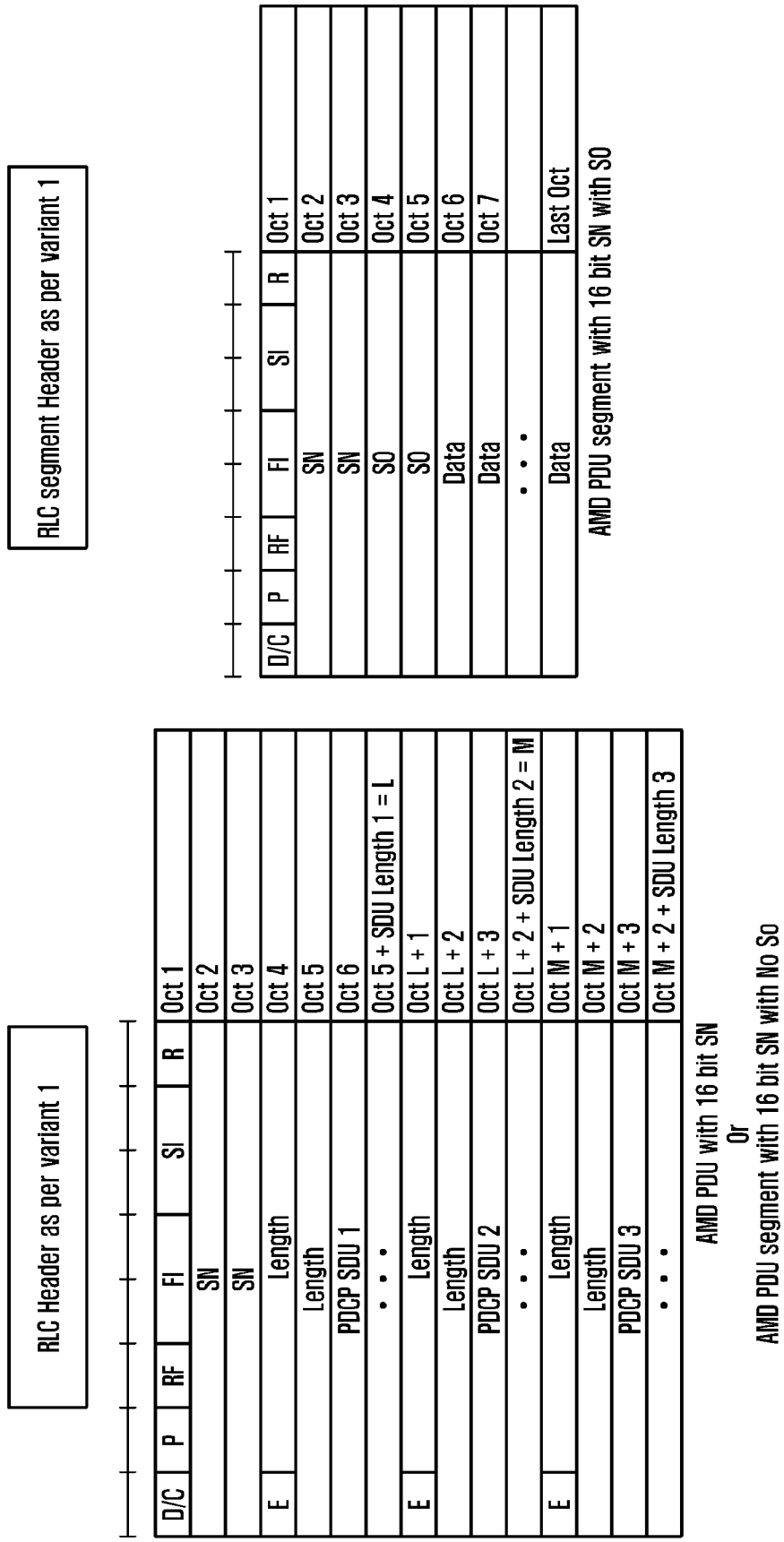
FIGS. 10A and 10B illustrate a variant 1 of Next Generation RLC Header structure, according to various embodiments of the disclosure.
Figure 10B:
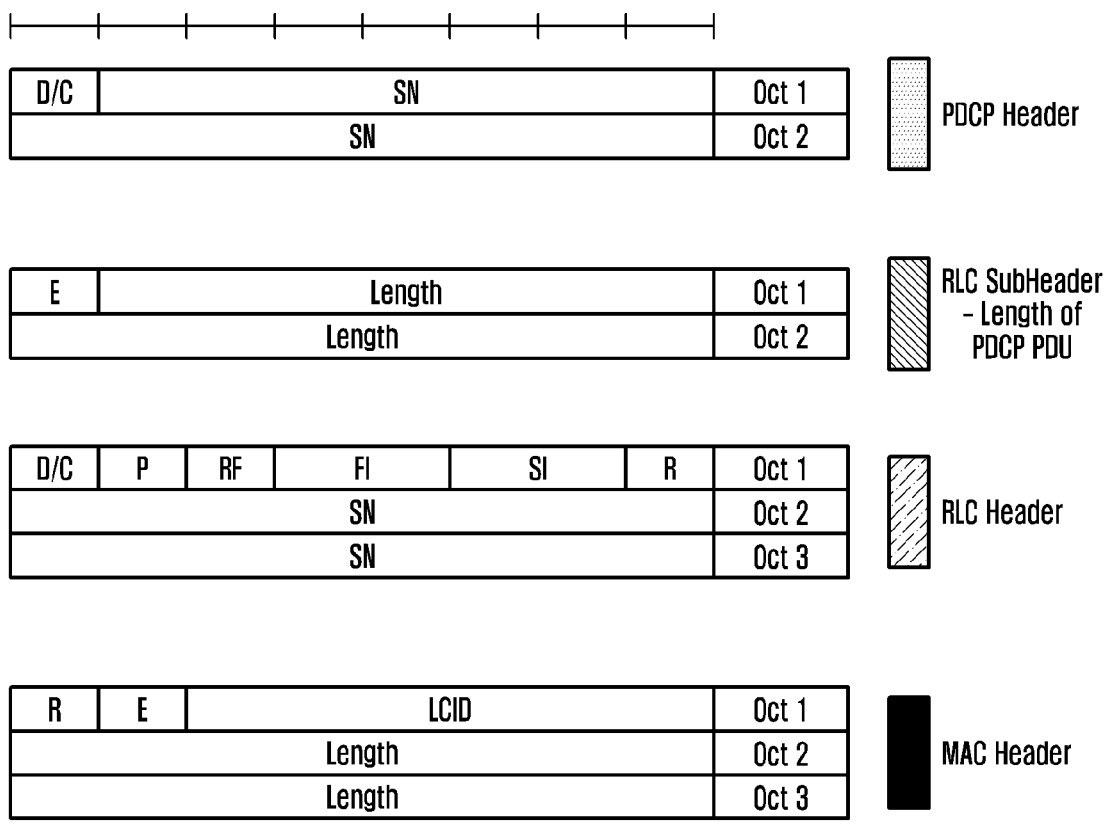

FIGS. 10A and 10B illustrate a variant 1 of Next Generation RLC Header structure, according to various embodiments of the disclosure.

Referring to FIGS. 10A and 10B, according to one implementation, in a data filed of the Next Generation RLC Header structure, portion belonging to the original AMD PDU may be kept as it is i.e., everything apart from fixed size RLC Header belong to Data. SI bits are used only for AMD PDU segment. PDCP Header consisting of only D/C bit and PDCP SN is assigned to every PDCP SDU i.e., internet protocol (IP) Packet. (SN length is considered as—15 bits). PDCP PDUs are delivered to lower layer at RLC. RLC Complete PDU has a fixed header size for SN length (considering 24 bit) which can be prepared for all the SNs before.

The Next generation of RLC Header according to variant 1 may consists of:
  D/C bit (Data: 1 and Control: 0);
  Poll bit (P bit);
  RF bit (0: AMD PDU, 1: AMD Segment PDU);
  Fragment Information (FI) (2 bits) indicate whether the first byte and the last byte of the RLC PDU corresponds to the first byte and the last byte of an RLC SDU, respectively;
  Segmentation Info (SI) (2 bits) Used primarily for PDU Segment; and
  Sequence Number (SN) (16 bits) (for indicative purpose).

Each PDCP PDU should be accompanied by an RLC Sub-Header for Length field of the PDCP PDU which may be placed before each PDCP PDU.

Extension bit (E bit) 1—A set of E, Length and Data PDU follows; 0—this is the last PDCP PDU portion in the RLC PDU.

Length (15 bits) —Length of PDCP PDU may be updated for all the PDCP PDUs.

Figure 11:
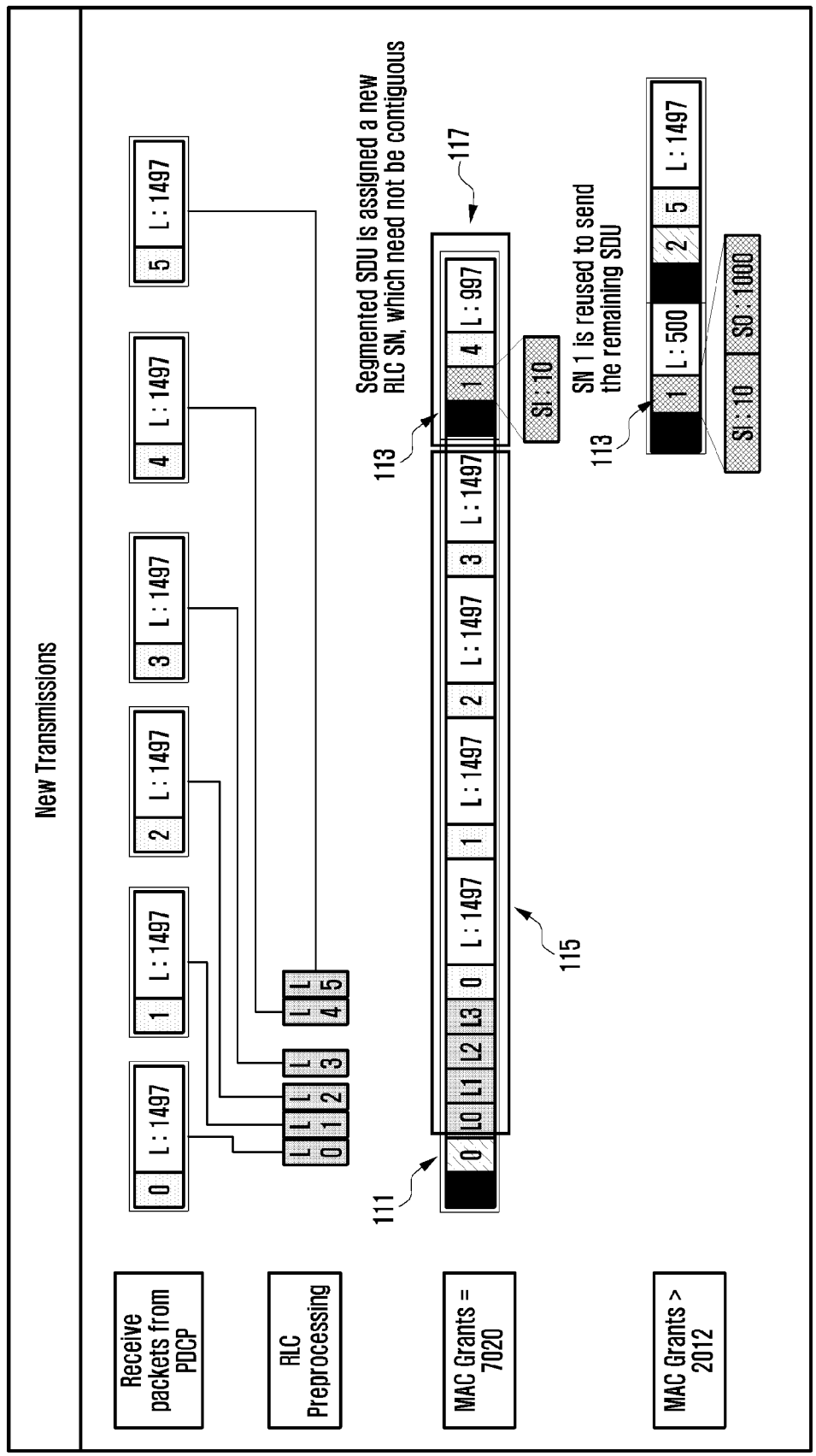
FIG. 11 illustrates a normal Transmission (TX) procedure according to the variant 1 of Next Generation RLC Header, according to an embodiment of the disclosure.

FIG. 11 illustrates a normal Transmission (TX) procedure according to the variant 1 of Next Generation RLC Header, according to an embodiment of the disclosure.

Initially, PDCP Header may be assigned by the PDCP layer and the packet may be delivered to RLC.
  RLC may have all the fixed size RLC Headers prepared based on the configured SN length. (D/C:1, P:0, RF:0, FI:00, SI:00).
  On reception of the PDCP PDU, RLC may prepare the RLC Sub-Header for Length of the PDCP PDU by assigning E bit to 1 and Length field. The length field may be prepared in the same memory just before the PDCP PDU or at a separate memory. This operation corresponds to the operation 701 of the FIG. 7. While doing parallel transmission, RLC can also choose to pack interleaved PDCP SDUs in a single TB.
  Based on the grant received, RLC may pack the available PDCP PDUs along with their Length Headers based on the order in which the packets are received and FI field is updated.
  The E bit belonging to the last PDCP belonging to this RLC PDU may be set to 0 indicating the end of RLC PDU. Additionally, the Length field of the last RLC Sub-Header may be updated to the actual Length of the PDCP PDU segment being accommodated.
  During the next grant opportunity/cycle, the remaining PDCP PDU segment may be transmitted, with appropriate FI and newly updated RLC Sub-Header for Length for the PDCP PDU segment.
  Single RLC PDU having concatenated multiple PDCP PDUs may have RLC Fixed Size Header consisting of a unique RLC SN.
  P bit in the RLC Header may be set as per the Poll conditions.
  MAC may assign a single MAC Sub-Header having the E, LCID and the Total Length of the RLC PDU.

As an example, according to the FIG. 11, let's say the available grants received is 7020, thus after RLC pre-processing the concatenation of one or more complete PDCP PDU was performed as shown in block 115. Thereafter, 0 is being assigned as first RLC SN at 111 to the concatenated complete PDCP PDU packets in block 115. Thereafter, the new PDCP PDU packet 117 which is which is truncated due to less available MAC grants was assigned with a new or unique RLC SN number i.e., 113. Thus, this complete transmission block was transmitted in this current transmission cycle. Further, the remaining segmented new PDCP PDU was transmitted in the next transmission cycle let's say here the next transmission cycle is shown when MAC grants received more than 2012. Thus, in the next transmission cycle same SN number i.e., 113 was used by the remaining segmented new PDCP PDUs. Thus, in the next transmission cycle a further segmentation of the new PDCP PDUs may be performed due to less available MAC grants. In such a scenario the remaining part of the segmented new PDCP PDU packets are split again into another at least one first complete PDCP PDU packet and the second new PDCP PDU packets. Here, the other at least one first complete PDCP PDU packet assigns with the same previously new RLC Sequence Number (SN) and the second new PDCP PDU packets will be assign with another new RLC Sequence Number (SN). Thereafter, preparing the RLC PDU by accommodating the at least one first complete PDCP PDU packet and the second new PDCP PDU packet based on the available MAC grants and transmit the same. Further, the a remaining part of the second new PDCP PDU packet will be transmitted in a next in the upcoming MAC grant transmission cycle.

Figure 12A:
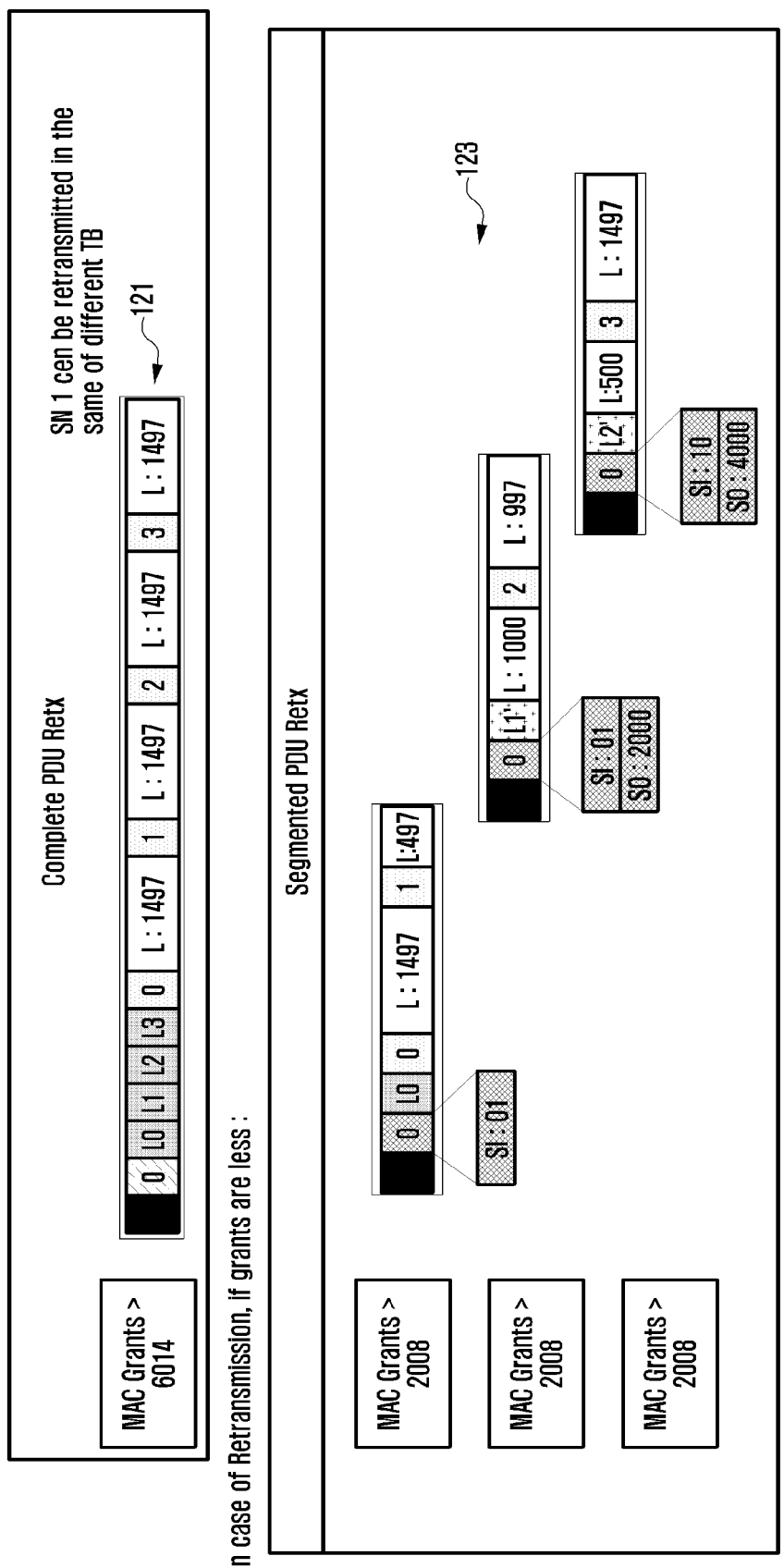
FIG. 12A illustrates Re-transmission and Re-segmentation mechanism, according to an embodiment of the disclosure.

FIG. 12A illustrates a Re-transmission and Re-segmentation mechanism, according to an embodiment of the disclosure. The Next Generation RLC Header Retransmission and Re-segmentation procedure will be explained henceforth.

Initially, there may be no case of RLC AMD PDU Segment to be formed during first transmission. However, RLC AMD PDU Segment may be formed during re-segmentation and retransmission only.
  Based on the Status PDU reception, ACKed RLC SNs may be freed. In particular, a complete PDCP PDUs which are not fragmented belonging to the ACKed RLC SN may be freed.
  PDCP PDU belonging to more than one RLC SN may be freed if each RLC SN is ACKed.
  For NACKed RLC SN, the RLC SN payload may be completely retransmitted.
  If available grant is sufficient enough, complete RLC PDU as previously formed for that RLC SN may be transmitted as it is, without any change in the Header. (Except P bit).

If available grant from MAC is less, then the retransmitting RLC PDU may be segmented further.

For the first AMD PDU segment to be retransmitted, RF flag is set as 1, SI flag mat be set as 01 (indicating First Segment) which does not have SO field as SO=0 is redundant information and FI may be updated as per the original AMD PDU.

On the next transmission opportunity, based on grant available, RLC AMD PDU Segment Header may be created by assigning the information as D/C—1, RF—1, SI—10 (for End of Segment) or SI—11 (middle of Segment), SN (as original AMD PDU) and SO (16 bits) —as per the actual offset for segment PDU. FI may be updated as per the original AMD PDU.

Accordingly, FI bits (Fragmentation Info) may optionally be set to the actual concatenated PDCP PDUs which are getting packed in RLC AMD PDU segments rather than keeping the original FI of the AMD PDU segment.

Figure 12B:
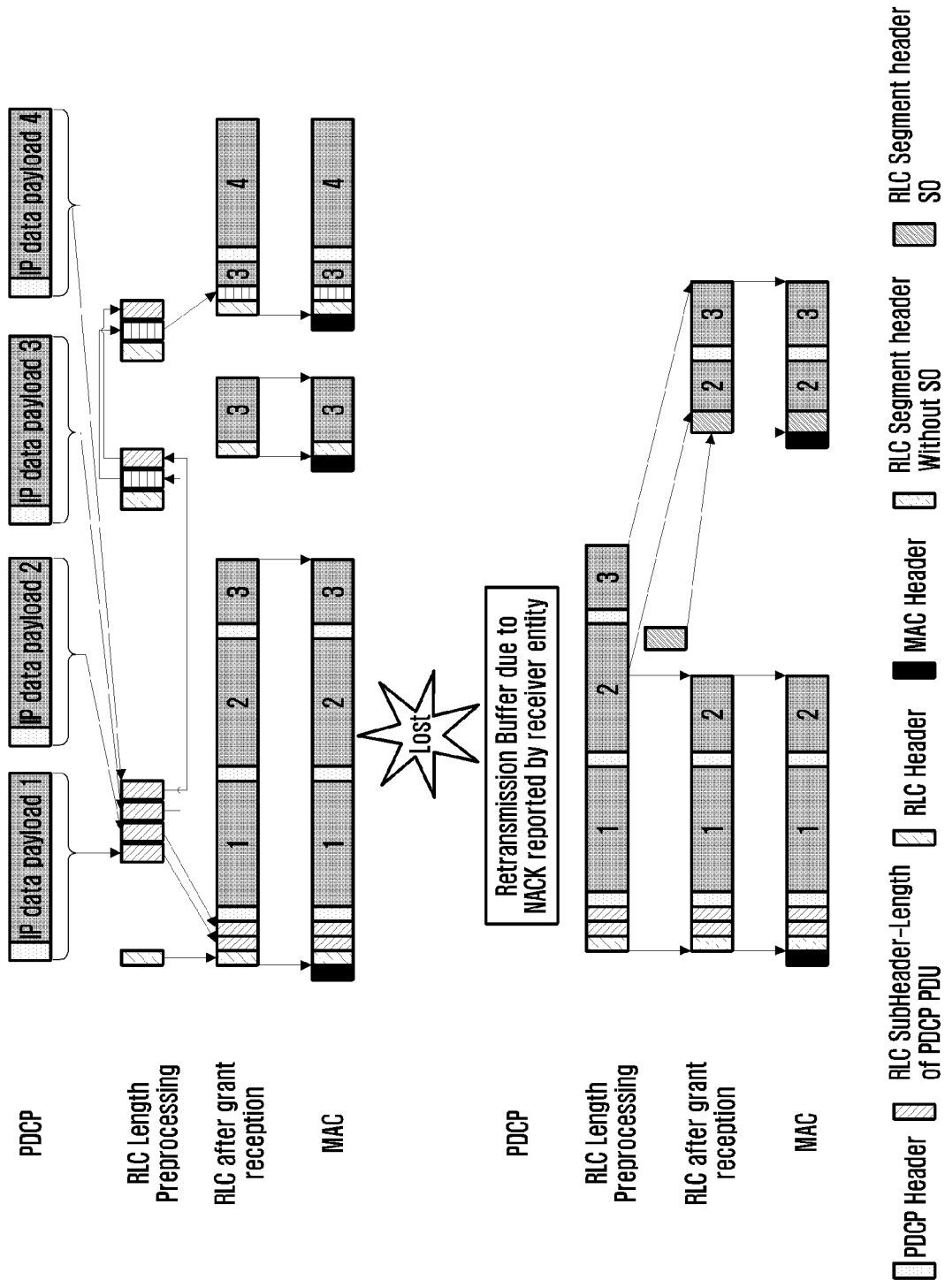
FIG. 12B illustrates yet another embodiment for Next Generation data plane during Re-transmission procedure preforming Re-segmentation mechanism, according to an embodiment of the disclosure.
Figure 27:
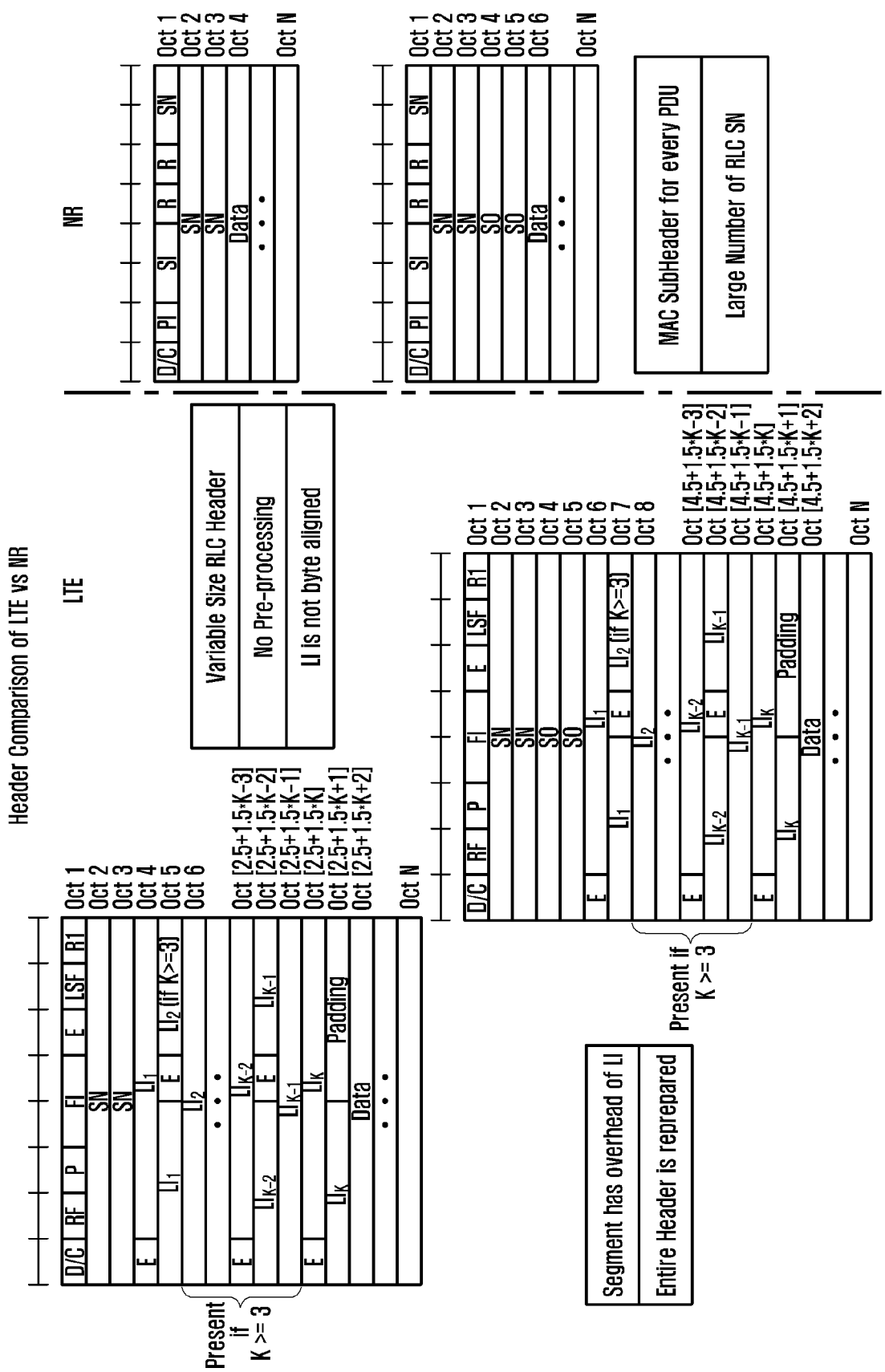
FIG. 27 illustrates the difference between Next Generation RLC header over the state-of-the-art RLC header structure, according to an embodiment of the disclosure.

FIG. 12B illustrates yet another embodiment for Next Generation data plane during Re-transmission procedure preforming Re-segmentation mechanism, according to an embodiment of the disclosure. Referring to FIG. 27, the Re-segmentation procedure is explained below.

Let's consider a scenario, in which RLC PDU gets lost. A transmitter entity receives an NACK reporting a loss of the RLC SN from a receiver entity, thus these packets have to be retransmitted again. For retransmission, the RLC header along with PDCP payload i.e., RLC PDU is stored in the retransmission buffer entity. If the grants available from MAC are enough to retransmit the complete PDU, then the original RLC PDU is transmitted as it is. If the available grant from MAC is less, then the RLC PDU will be segmented further in the Re-segmentation mechanism as depicted in FIG. 27. When re-transmitting the first segment of the original RLC PDU, only the RF and SI bit are updated to 0 and 01 respectively to indicate that this portion is the first segment of the original RLC PDU corresponding to the RLC SN which is NACKed. During the next transmission opportunity, an RLC Segment Header is prepared indicating the correct SO, and the remaining segment(s) of the RLC PDU are retransmitted without changing any original RLC PDU information.

Now, various variants of the RLC header structure will be described in detail below.

FIG. 13 illustrates UMD PDU Header structure in variant 1, according to an embodiment of the disclosure.

The UMD PDU may not contain SN if FI=00. UMD PDU may contain SN if FI=01, 10, 11. A new RLC SN may be allocated for every subsequent UMD PDU whose FI is going to be either of 01, 10 or 11. Further, there may be no UMD PDU Segments, and interpretation of E and Length field is the same as AMD PDU.

According to yet another embodiment, multiple variants of Next Generation RLC Header structure will be explained henceforth. In one implementation in variant 3, instead of E bit in the RLC Length Sub-Header, the number of PDCP PDUs added may be indicated by an RLC Sub-Header for NumSDUs. Further, in variant 1 and 3, the RLC Sub-Header for length may be distributed across the RLC PDU. Although, the distributed RLC Sub-Header Length may not have any issues if hardware (HW) parsing is done. However, during Parsing of RLC Header in SW, accessing memory across the entire stretch of RLC PDU to parse the distributed RLC Sub-Header for Length, may cause more cache miss along with burdensome processing. Hence, all the RLC Sub-Header Lengths may be packed together in the beginning of the RLC Header itself and PDCP PDUs may be placed continuously after that. This approach may give rise to further variants of variant 1 and variant 3 as described above.

According to yet another embodiment, a total RLC PDU length may be included in the MAC Sub-Header for the RLC PDU. Optionally, the length field for the last SDU in the RLC PDU may be redundant and may not be included. Its length may be calculated as =(Total RLC PDU length—(sum of the length of all other RLC SDUs)). This further gives rise to more variants where the Length of the RLC SDU for the last SDU in the RLC PDU is not included. The AMD PDU Segment Header for all options remain the same irrespective of any Option. Further, UMD PDU Header follows the same packing for the Length Sub-Header based on the above Option.

Thus, the Next Generation RLC Header structures are achievable, with any variant, based on at least one of the following parameters:

Position of RLC Length Sub-Header;
Distributed RLC Length Sub-Header—Placed just before every PDCP PDU;
Packed RLC Length Sub-Header—All length sub-headers are placed just after the RLC Fixed Header;
Indication of Length;
Using E bit to indicate Next set of Length field present;
Using NumSDUs to indicate total Length fields present for the total PDCP PDUs concatenated;
Length of the Last SDU in the RLC PDU Included; and
If not included then to be computed from total RLC PDU length in MAC Sub-Header—(sum of Length of other SDUs).

FIG. 14 illustrates yet another variant 3 of Next Generation RLC Header, according to an embodiment of the disclosure.

In one implementation length of PDCP PDU may be of 2-byte Length field placed before the PDCP PDU. The Number of SDUs concatenated in the RLC PDU may be indicated by the field followed by NumSDUs (8 bits). Rest all parameter interpretation and procedure remains the same as described in the above embodiments. AMD PDU Segment structure is the same as described in FIG. 8 above. Except for the fixed size RLC Header, the remaining bytes of the original AMD PDU are considered as Data portion for the AMD PDU Segment. Optionally, Since NumSDUs are=1 is redundant information, this can be indicated using R bit Indicating whether NumSDUs exist (1) or not (0).

FIG. 15 illustrates UMD PDU Headers as per variant 3, according to an embodiment of the disclosure. The description of UMD PDU Header is the same as explained in FIG. 10A. Thus, for the sake of brevity, the description of the UMD PDU Header is omitted here.

Figure 16:
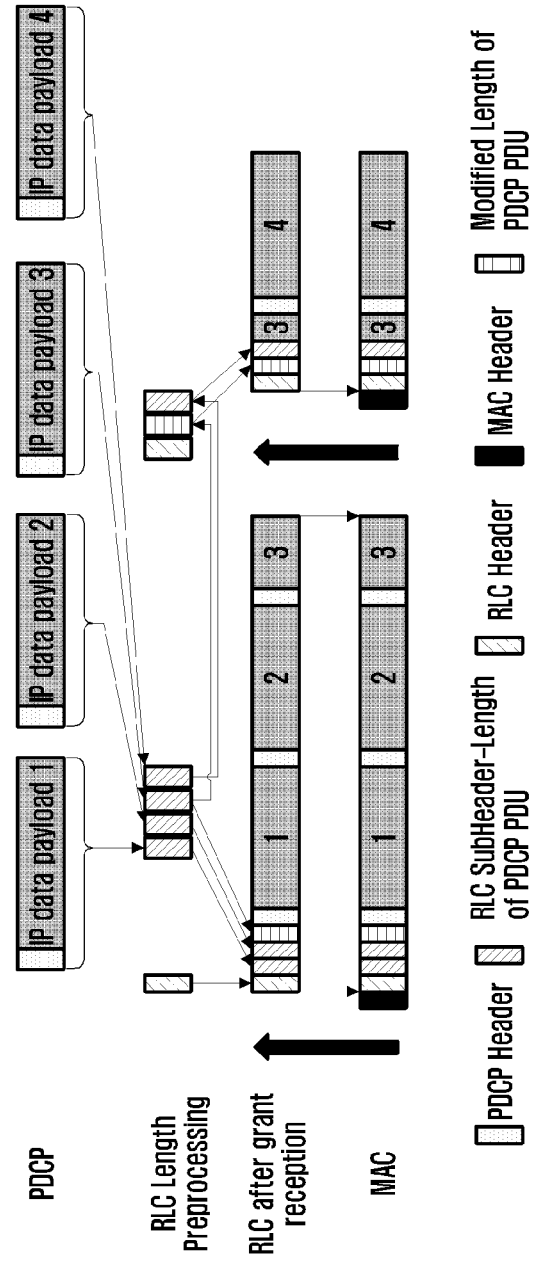
FIG. 16 illustrates yet another embodiment of user plane data as per variant 1/variant 3 of data plane with packed length sub-Header, according to an embodiment of the disclosure.

FIG. 16 illustrates yet another embodiment of user plane data as per variant 1/variant 3 of data plane with packed length sub-Header, according to an embodiment of the disclosure.

FIG. 17 illustrates a further embodiment as per variant 1/variant 3 of Next Generation RLC Header with Packed Length Sub-Header, according to an embodiment of the disclosure. In this AMD PDU with 16-bit SN or AMD PDU segment with 16 bit SN with No SO.

Figure 18:
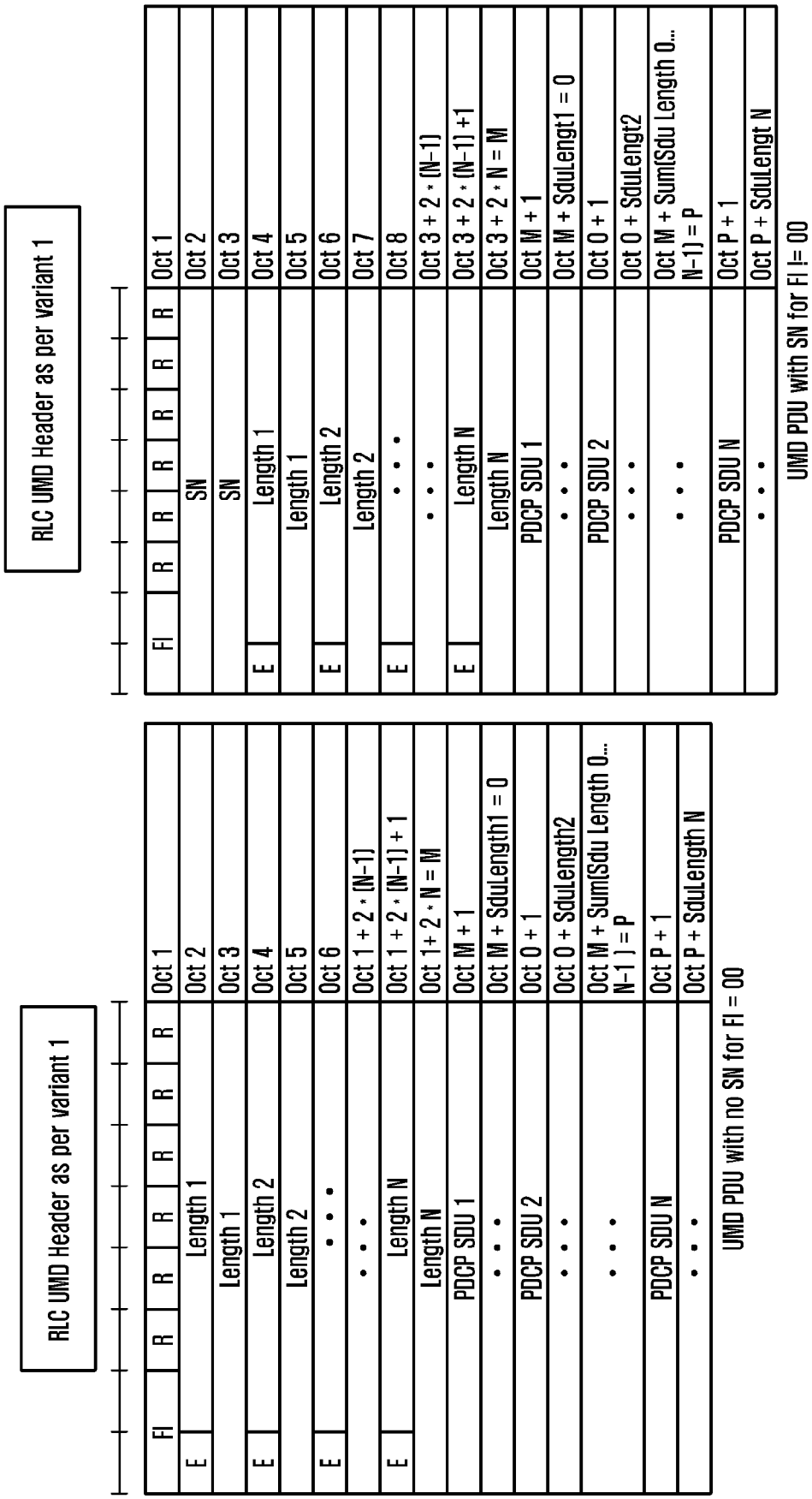
FIG. 18 illustrates another embodiment of UMD PDU Header with Packed Length Sub-Header as per variant 1, according to an embodiment of the disclosure.

FIG. 18 illustrates another embodiment of UMD PDU Header with Packed Length Sub-Header as per variant 1, according to an embodiment of the disclosure.

FIG. 19 illustrates yet another embodiment of UMD PDU Header with Packed Length Sub-Header as per variant 3, according to an embodiment of the disclosure.

Figure 20:
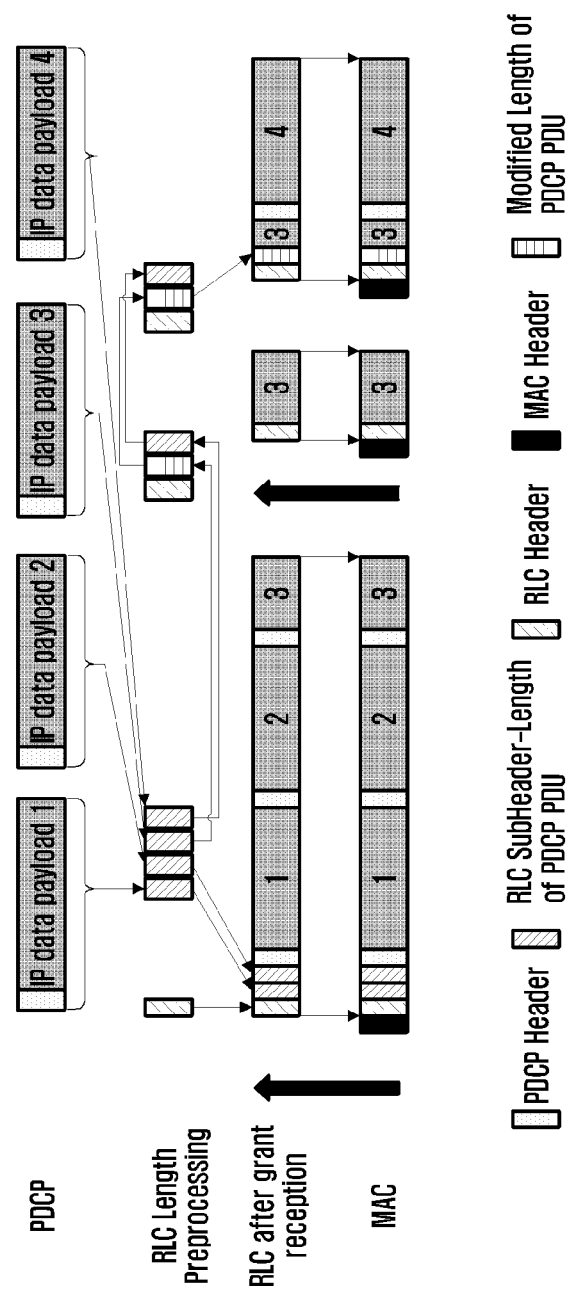
FIG. 20 illustrates further embodiment of Next Generation data plane as per variant 1/variant 3 with Packed Length Sub-Header without Last SDU Length, according to an embodiment of the disclosure.

FIG. 20 illustrates further embodiment of Next Generation data plane as per variant 1/variant 3 with Packed Length Sub-Header without Last SDU Length, according to an embodiment of the disclosure.

Figure 21:
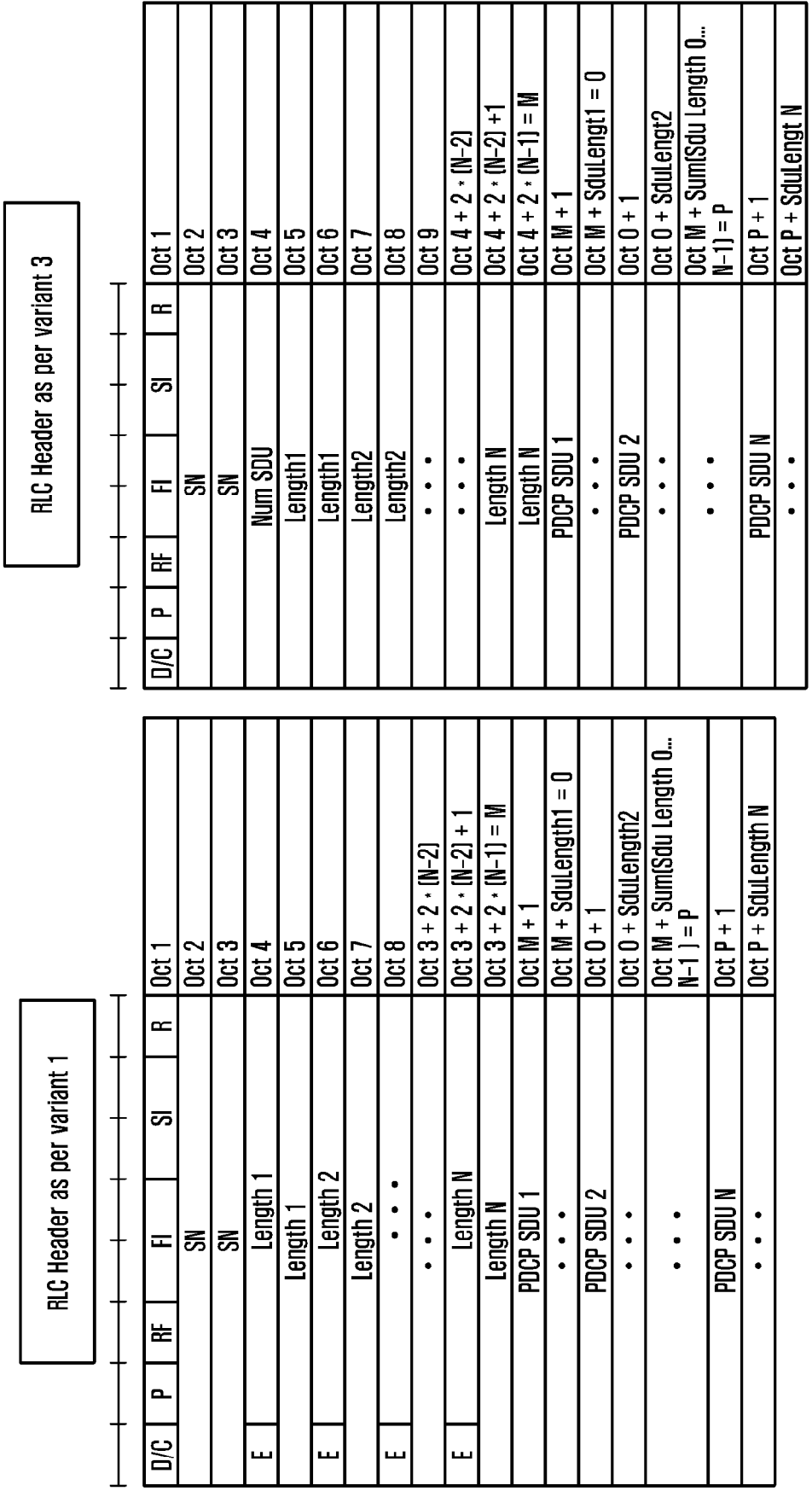
FIG. 21 illustrates another embodiment of Next Generation RLC header as per variant 1/variant 3 with Packed Length Sub-Header without Last SDU Length, according to an embodiment of the disclosure.

FIG. 21 illustrates another embodiment of Next Generation RLC header as per variant 1/variant 3 with Packed Length Sub-Header without Last SDU Length, according to an embodiment of the disclosure. Accordingly, AMD PDU is with 16 bit SN with N>1 or AMD PDU segment is with 16 bit SN with No SO with N>1.

Figure 22:
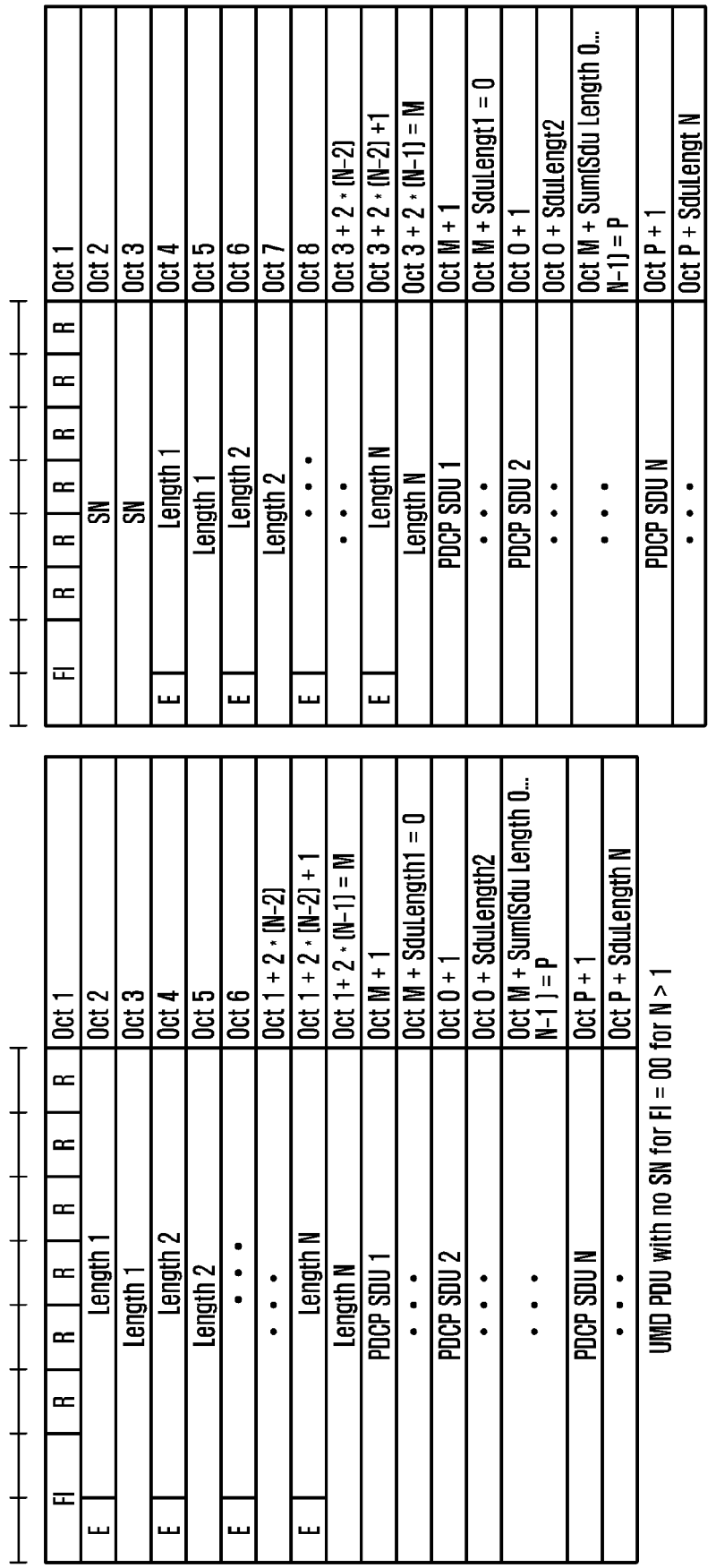
FIG. 22 illustrates yet another embodiment of UMD PDU Header as per variant 1 with Packed Length Sub-Header without Last SDU Length, according to an embodiment of the disclosure.

FIG. 22 illustrates yet another embodiment of UMD PDU Header as per variant 1 with Packed Length Sub-Header without Last SDU Length, according to an embodiment of the disclosure.

FIG. 23 illustrates yet another embodiment of UMD PDU Header as per variant 3 with Packed Length Sub-Header without Last SDU Length, according to an embodiment of the disclosure. Accordingly, UMD PDU with no SN for FI=00 for N>1 or UMD PDU with 16 SN for FI!=00 for N>1.

FIG. 24 illustrates another embodiment of Next Generation RLC header as per variant 1/variant 3 with Distributed Length Sub-Header without Last SDU Length, according to an embodiment of the disclosure. Accordingly, AMD PDU with 16 bit SN with N>1 Or AMD PDU segment with 16 bit SN with No SO with N>1.

FIG. 25 illustrates yet another embodiment of RLC UMD PDU Header as per variant 1 with Distributed Length Sub-Header without Last SDU Length, according to an embodiment of the disclosure. Accordingly, UMD PDU with no SN for FI=00 for N>1 or UMD PDU with 16 SN for FI!=00 for N>1.

Figure 26:
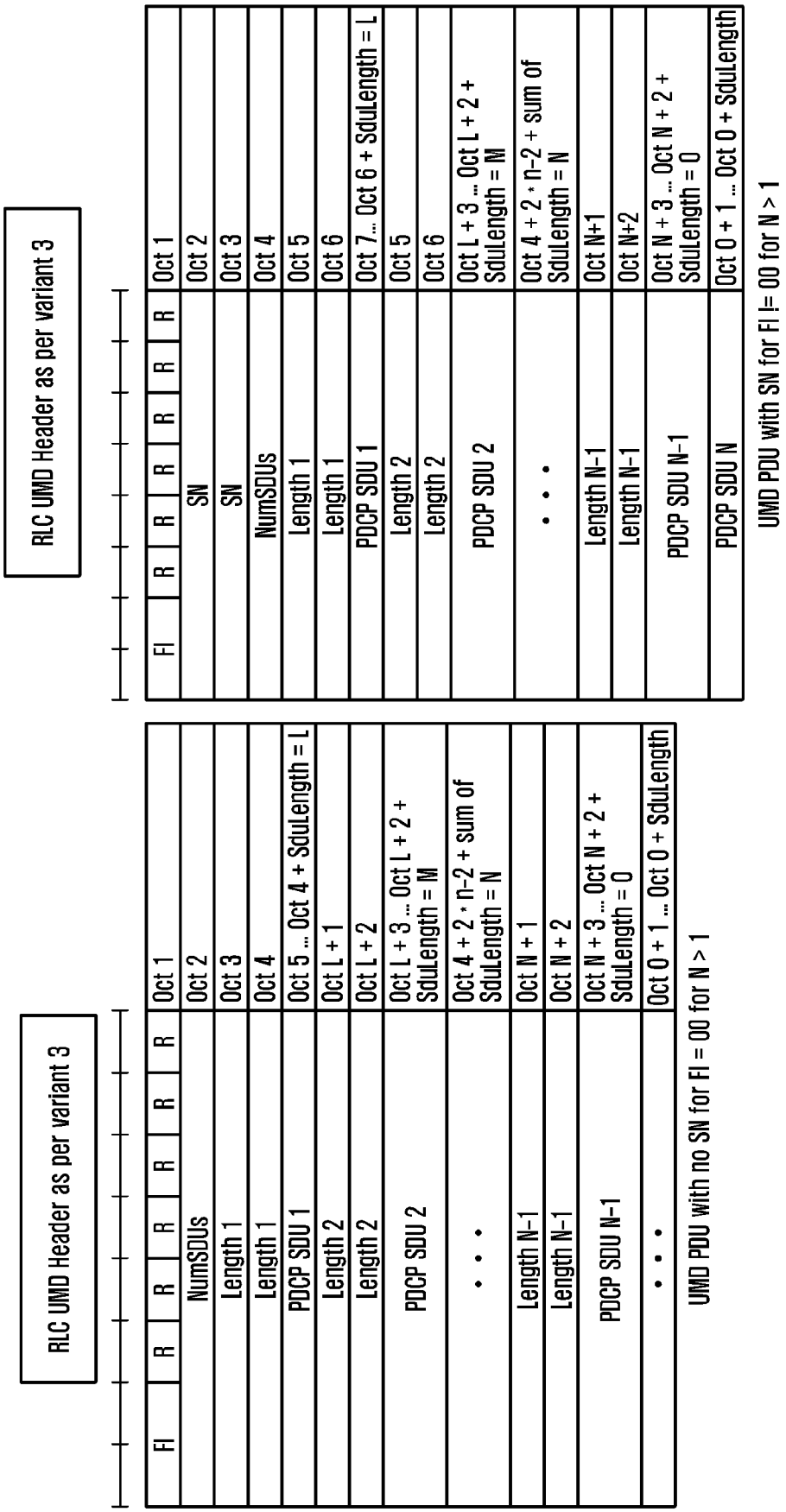
FIG. 26 illustrates another embodiment of RLC UMD PDU Header as per variant 3 with Distributed Length Sub-Header without Last SDU Length, according to an embodiment of the disclosure.

FIG. 26 illustrates another embodiment of RLC UMD PDU Header as per variant 3 with Distributed Length Sub-Header without Last SDU Length, according to an embodiment of the disclosure. Accordingly, UMD PDU with no SN for FI=00 for N>1 or UMD PDU with 16 SN for FI not equal to 00 for N>1.

Thus, with the aforementioned multiple variants of RLC header structure, the disclosure may attain the best as compared to both 4G and 5G RLC Header structure. In particular, the advantages over 4G are that the present variants of RLC header structure have a fixed size of RLC Header and Pre-processing. With respect to the 5G, the disclosure provides a reduced number of RLC SN and less number of MAC Sub-Headers. As RLC PDU concatenates multiple PDCP PDUs into a single RLC PDU the number of RLC SNs required in case of a very high data rate drastically reduces. Further, the RLC Fixed Header size is of constant size as the Length field of the PDCP PDU is pushed and split across the RLC PDU. This helps in pre-processing as explained above. Furthermore, the RLC AMD PDU Segment Header size is of the same size for the first segment and hence is easier to interpret. The RLC AMD PDU Segment Header size has 2 bytes extra field for SO in the case of Middle of Segment and End of Segment of the original AMD PDU. Yet furthermore, by having fixed locations and sizes of MAC, RLC, and PDCP Headers, all PDCP Headers except those (which get fragmented while concatenation), can be parsed in HWA. However, if the minimum grant guarantee supports the combined size of MAC Sub Header, RLC Header, Length of PDCP PDU Header, and PDCP Header, then all PDCP Headers, RLC Headers and MAC Headers may be implemented using HWA for any AMD PDU (except AMD PDU segment). Further, having no segments in the first transmission simplifies RLC Status Report processing tremendously. Furthermore, Segment Handling has to be limited to the case of Re-Segmentation. Thus, the disclosure provides a) less Number of RLC SN b) Fixed Size RLC Header c) Pre-processing d) Efficient Segmentation Information.

In view of the aforesaid, there are provided various advantageous features relating to the disclosure:

Concatenating multiple packets which are consecutively packed in the TB especially in the case where packet sizes are smaller. This can improve the reception (RX) side performance by about 3 times for a standard IP packet of 1500 Bytes when best possible grants are available.

Proposed Header structure packing allows a simplified RX processing with enhanced TX pre-processing and scope for parallel TX implementation.

Reduces the number of RLC SNs required in case of very high data rate as RLC PDU concatenates multiple PDCP PDUs into a single RLC PDU. This will in turn, also reduce the RX processing load as well and completed PDCP PDUs gets delivered immediately once validated.

The RLC Fixed Header size is of constant size as the Length field of the PDCP PDU is considered as a separate RLC Sub-Header.

Easier to interpret The RLC AMD PDU Segment Header size, as it is also of the same size for the first segment. The RLC AMD PDU Segment Header size has 2 bytes extra field for SO in case of Middle of Segment and End of Segment of the original AMD PDU.

RLC Status Report processing simplifies tremendously as RLC SN compared to NR are reduced by ~2/N, where N are the RLC SDUs which are getting concatenated into a single RLC PDU.

Processing of RLC TX and RLC RX is possible in parallel cores fastening up the entire process.

Having fixed locations and sizes of MAC, RLC and PDCP Headers, all PDCP Headers except those (which get segmented), then all Headers can be parsed in HWA.

FIG. 27 illustrates the difference between a Next Generation RLC header over the state-of-the-art RLC header structure, according to an embodiment of the disclosure. There is variable size RLC Header, No Pre-processing, and LI is not byte aligned in LTE. NR require large number of RLC SN, and MAC Sub Header for every PDU. Next Generation RLC header has following advantages:

RLC Header is of fixed size and be pre-pared in memory.

Length Sub-Header is Byte Aligned and can be prepared in parallel TX cores for any incoming RLC SDUs.

Length information becomes part of RLC Sub-Header. From Length Sub-Header onwards, RLC PDU payload is considered.

Length field of the last packed PDCP PDU is omitted from the header.

Single RLC SN exists for the consecutive PDCP PDUs which can be completely packed in at TB.

First Segment of the PDCP PDU getting transmitted only need to update SI field=(01) and SO does not exist for that.

New 5-byte RLC Segment Header is prepared only for Middle/Last Segment(s) of that PDCP PDU in subsequent grants.

Figure 28:
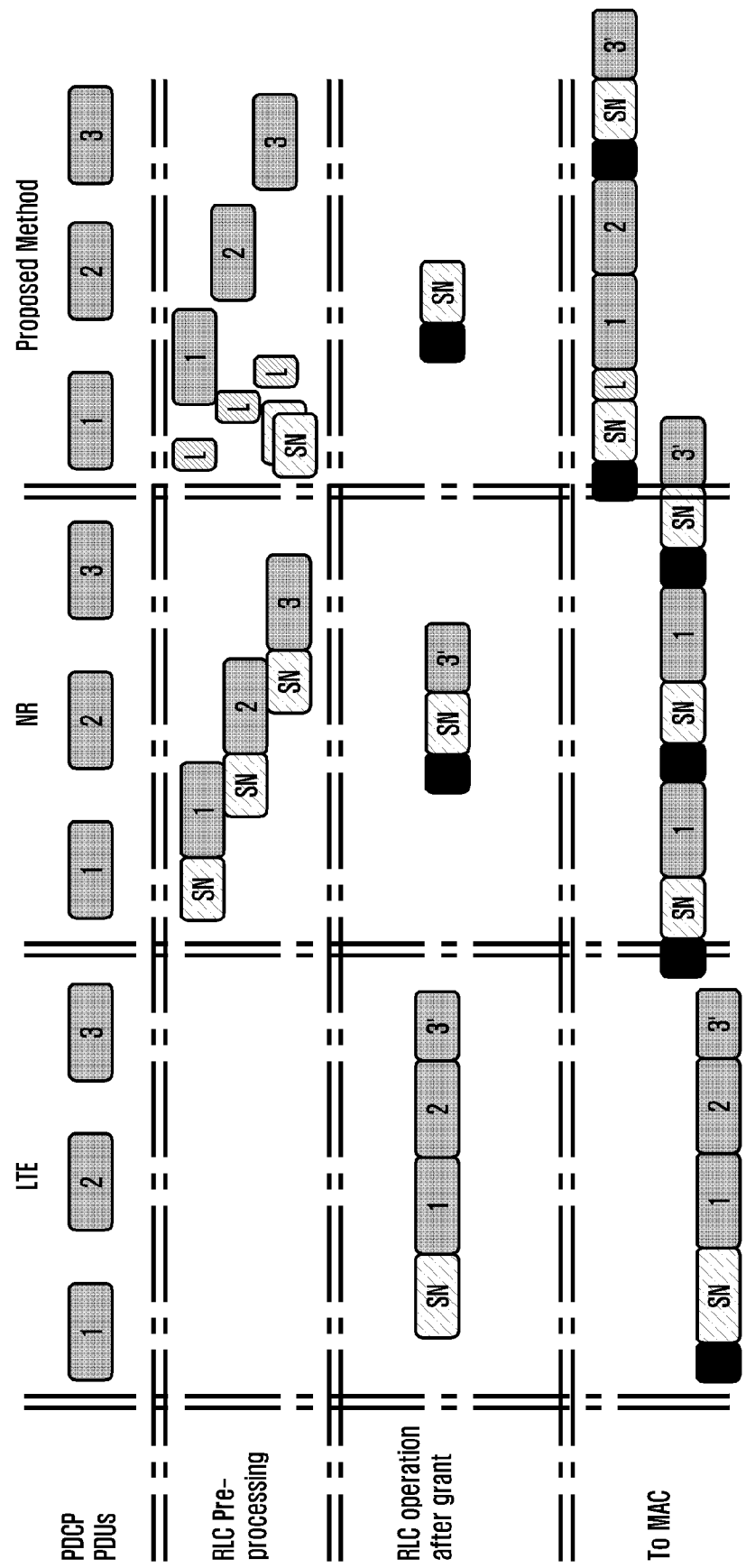
FIG. 28 illustrates the difference between RLC mechanism over the state-of-the-art RLC header structure, according to an embodiment of the disclosure.

FIG. 28 illustrates the difference between an RLC mechanism over the state-of-the-art RLC header structure, according to an embodiment of the disclosure. In LTE, Single MAC TB contains only single RLC SN per logical channel (LCH) whereas in proposed RLC mechanism Single MAC TB will contain single RLC SN for all completely packed RLC SDUs and RLC SNs for each RLC Segment. Further in LTE, Fragmentation/Reassembly is based on FI field and consecutive RLC SN. SI and SO fields are applicable only for Segment Retransmissions or Re-Segmentation, whereas in new method segmentation/reassembly may be based on RLC SN, SI and SO fields. The new method supports Parallel TX processing. Further, in NR RLC SN space is same as that of PDCP SN space whereas in new RLC mechanism RLC SN Space is PDCP SN Range*2/N where N is the average number of RLC SDU in each MAC TB.

FIG. 29 illustrates various simulation results, according to an embodiment of the disclosure. Accordingly following are benefits of Next generation RLC Mechanism over state-of-the-art technique.

Referring to FIG. 29, the CPU cycles is compared with NR and Proposed RLC mechanism in a simulated environment. Scenario simulated: Grants(G): 13686 Bytes, Size(S): 1500B, PDU Drop Rate(B): 0% and 10%. As the number of RLC SN reduced drastically in case of the proposed method, for each PDCP SDU the average cycle required for RX processing has a gain of about ~40% (2350 cycles→1412 cycles)

Table 1 illustrates feature comparison between LTE, NR, and Next generation RLC mechanism. Features such as Pre-Processing, Parallel TX, TX Cycles, Parallel RX, Hardware friendly Structure, SN Space Requirement, and Rx Processing Cycles etc. are considerations for comparison, and illustrates an advantage of a next generation RLC mechanism over state-of-the-art technique.

TABLE 1

| Features | | LTE | NR | Fast Packed ARQ |
|---|---|---|---|---|
| Pre-Processing | | Impossible | Possible | Possible |
| Parallel TX: CA/MIMO | | Difficult | Possible | Possible |
| TX Cycles/SDU | Drop: 0% | — | 1164 | 1164 |
| | Drop: 10% | — | 1640 | 1385 |
| Parallel RX: | | Possible | Possible | Possible |
| Hardware friendly Structure | | No | Yes | Yes |
| SN Space Requirement | | X/N | X | X/N |
| Rx Processing Cycles | | Low | High | Low |
| RX Cycles/SDU | Drop: 0% | — | 2350 | 1412 |
| | Drop: 10% | — | 2104 | 1197 |

Figure 30:
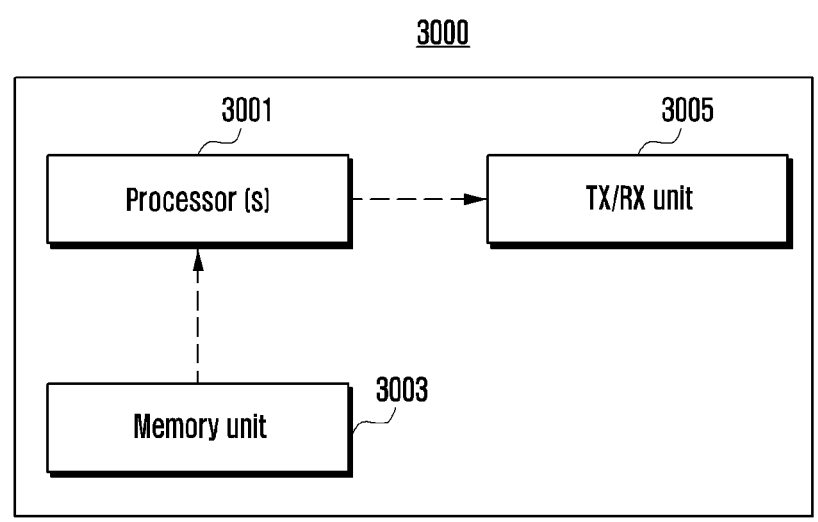
FIG. 30 illustrates another diagram of a network node, according to an embodiment of the disclosure.

FIG. 30 illustrates another diagram of a network according to an embodiment of the disclosure.

Referring to FIG. 30, a network node 3000 may include a TX/RX unit 3005 (e.g., communicator or communication interface), a memory unit 3003 (e.g., storage), and at least one processor 3001. Further, the network node 3000 may also include the Cloud-RAN (C-RAN), a Central Unit (CU), a core Network (NW), a Distributed unit (DU) or the any other possible network (NW) entity. The various examples of the network node are explained above therefore omitted here for the sake of brevity. The TX/RX unit 3005 may be used as a transmitter entity or a receiver entity perform functions for transmitting and receiving signals via a wireless channel.

In an example, the processor 3001 may be a single processing unit or a number of units, all of which could include multiple computing units. The processor 3001 may be implemented as one or more microprocessors, microcomputers, microcontrollers, digital signal processors, central processing units, state machines, logic circuitries, and/or any devices that manipulate signals based on operational instructions. Among other capabilities, the processor 3001 is configured to fetch and execute computer-readable instructions and data stored in the memory. The processor may include one or a plurality of processors. At this time, one or a plurality of processors may be a general-purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The one or a plurality of processors control the processing of the input data in accordance with a predefined operating rule or artificial intelligence (AI) model stored in the non-volatile memory and the volatile memory. The predefined operating rule or artificial intelligence model is provided through training or learning.

The memory may include any non-transitory computer-readable medium including, for example, volatile memory, such as static random-access memory (SRAM) and dynamic random-access memory (DRAM), and/or non-volatile memory, such as read-only memory (ROM), erasable programmable ROM, flash memories, hard disks, optical disks, and magnetic tapes.

Figure 31:
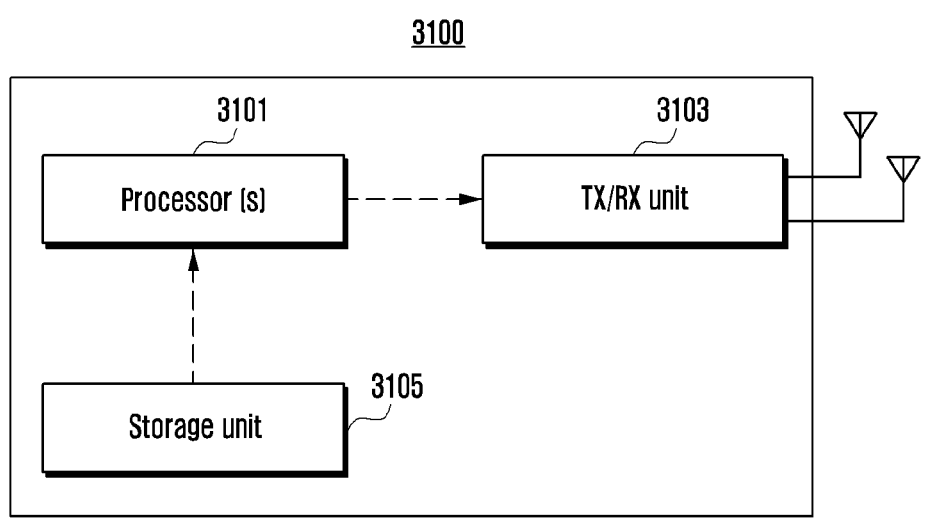
FIG. 31 is a diagram illustrating the configuration of a terminal in a wireless communication system, according to an embodiment of the disclosure.

FIG. 31 is a diagram illustrating the configuration of a terminal in a wireless communication system according to an embodiment of the disclosure. The configuration of FIG. 31 may be understood as a part of the configuration of the terminal. Hereinafter, it is understood that terms including "unit" or "er" at the end may refer to the unit for processing at least one function or operation and may be implemented in hardware, software, or a combination of hardware and software.

Referring to FIG. 31, a terminal 3100 may include a TX/RX unit 3103 (e.g., communicator or communication interface), a storage unit 3105 (e.g., storage), and at least one processor 3101. By way of example, the terminal 3100 may be a User Equipment, such as a cellular phone or other device that communicates over a plurality of cellular networks (such as a third generation (3G), 4G, a 5G or pre-5G network, 6G or any future wireless communication network). The TX/RX unit 3103 may be used as transmitter entity or a receiver entity and may perform functions for transmitting and receiving signals via a wireless channel.

Unless otherwise defined, all technical and scientific terms used herein have the same meaning as commonly understood by one of ordinary skilled in the art to which this disclosure belongs. The system, methods, and examples provided herein are illustrative only and not intended to be limiting.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for transmitting data for an established radio link between a user equipment (UE) and a network node, the method comprising:
   receiving, by a radio link control (RLC) layer, a plurality of protocol data unit (PDU) packets from a packet data convergence protocol (PDCP) layer;
   pre-processing, by the RLC layer, an RLC sub header of an RLC header of each of the plurality of PDU packets based on a service data unit (SDU) length, which is received from the PDCP layer, for each of the plurality of the PDU packets;
   concatenating, by the RLC layer, at least one complete PDCP PDU packet from the plurality of the PDU packets into an RLC PDU along with RLC sub header length information based on available medium access control (MAC) grants;
   segmenting, by the RLC layer, the plurality of PDU packets into a new PDCP PDU packet which is truncated due to less available MAC grants;
   preparing an RLC PDU along with the RLC header comprising the concatenated at least one complete PDCP PDU packet and at a most one new PDCP PDU packet getting segmented based on the available MAC grants; and
   transmitting, by the RLC layer to a lower MAC layer, the RLC PDU.

2. The method of claim 1, further comprising:
   assigning a first RLC sequence number (SN) to the concatenated at least one complete PDCP PDU packet; and
   assigning a new RLC SN to the new PDCP PDU packet.

3. The method of claim 1, further comprising:
  receiving, by the RLC layer, the available MAC grants from the lower MAC layer,
  wherein the RLC header comprises a pre-determined fixed size.
4. The method of claim 2, wherein the preparing of the RLC PDU comprises:
  determining, by the RLC layer, whether the available MAC grants are sufficient to include the at least one complete PDCP PDU packet;
  splitting the plurality of PDU packets into the at least one complete PDCP PDU packet and the new PDCP PDU packet based on the available MAC grants and available PDCP PDUs, wherein the new RLC SN is assigned to the new PDCP PDU packet and is different from the first RLC SN to the concatenated at least one complete PDCP PDU packet, wherein a new RLC header of the new PDCP PDU packet includes only the new RLC SN without including the RLC Sub header length information; and
  preparing the RLC PDU by accommodating the new PDCP PDU packet with the at least one complete PDCP PDU packet based on the available MAC grants,
  wherein the at least one complete PDCP PDU packet are defined as PDCP PDU packets that can be completely transmitted and the new PDCP PDU packet is defined as a PDCP PDU packet that cannot be completely transmitted according to the available MAC grants,
  wherein, based on the available MAC grants and the PDCP PDUs not being sufficient, the RLC PDU is prepared with the at least one complete PDCP PDU packet, and
  wherein the RLC PDU is transmitted with the at least one complete PDCP PDU packet.
5. The method of claim 4, further comprising:
  transmitting, in subsequent PDUs, a remaining part of the new PDCP PDU packet that is unaccommodated in the RLC PDU with the assigned new RLC SN in a next MAC grant transmission cycle.
6. The method of claim 5, further comprising:
  receiving the available MAC grants, by the RLC layer, for the next MAC grant transmission cycle;
  determining, by the RLC layer, whether the available MAC grants are sufficient to include at least one first complete PDCP PDU packet from the remaining part of the new PDCP PDU packet;
  splitting the remaining part of the new PDCP PDU packet into the at least one first complete PDCP PDU packet and a second new PDCP PDU packet based on the available MAC grants and the available PDCP PDUs, wherein the new RLC SN is assigned to the at least one first complete PDCP PDU packet;
  assigning another new RLC SN to the second new PDCP PDU packet that is different from the new RLC SN, wherein a new RLC header of the second new PDCP PDU packet includes only the other new RLC SN without including the RLC Sub header length information; and
  preparing the RLC PDU by accommodating the at least one first complete PDCP PDU packet and the second new PDCP PDU packet based on the available MAC grants, wherein a remaining part of the second new PDCP PDU packet is transmitted in the next MAC grant transmission cycle.

7. The method of claim 1, further comprising:
  receiving, from a receiver entity, an unsuccessful acknowledge message associated with a failure in transmission of the RLC PDU;
  retransmitting, in a next transmission cycle, the RLC PDU to the lower MAC layer based on the receiving of the unsuccessful acknowledge message;
  receiving, by the RLC layer in the next transmission cycle, newly available MAC grants from the lower MAC layer;
  determining a sufficiency of the newly available MAC grants to retransmit the RLC PDU in the next transmission cycle;
  retransmitting, by the RLC layer to the lower MAC layer, the RLC PDU along with the RLC header similar to the failure in transmission of the RLC PDU based on the sufficiency of the newly available MAC grants;
  determining, by the RLC layer, whether the newly available MAC grants are insufficient to retransmit the RLC PDU with the newly available MAC grants; and
  re-segmenting the RLC PDU based on a result of the determining of whether the newly available MAC grants are insufficient, wherein the re-segmenting corresponds to the segmenting of the plurality of PDU packets into at least two RLC PDU packets which is truncated due to less availability of the newly available MAC grants.
8. An apparatus for transmitting data for an established radio link between a user equipment (UE) and a network node, the apparatus comprising:
  a transceiver configured to transmit and receive a signal; and
  a processor coupled with the transceiver and configured to:
    receive, by a radio link control (RLC) layer, a plurality of protocol data unit (PDU) packets from a packet data convergence protocol (PDCP) layer,
    pre-process, by the RLC layer, an RLC sub header of an RLC header of each of the plurality of PDU packets based on a service data unit (SDU) length, which is received from the PDCP layer, for each of the plurality of the PDU packets,
    concatenate, by the RLC layer, at least one complete PDCP PDU packet from the plurality of the PDU packets into an RLC PDU along with RLC sub header length information based on available medium access control (MAC) grants,
    segment, by the RLC layer, the plurality of PDU packets into a new PDCP PDU packet which is truncated due to less available MAC grants,
    prepare an RLC PDU along with the RLC header comprising the concatenated at least one complete PDCP PDU packet and at a most one new PDCP PDU packet getting segmented based on the available MAC grants, and
    transmit, by the RLC layer to a lower MAC layer, the RLC PDU.
9. The apparatus of claim 8, wherein the processor is further configured to:
  assign a first RLC sequence number (SN) to the concatenated at least one complete PDCP PDU packet, and
  assign a new RLC SN to the new PDCP PDU packet.
10. The apparatus of claim 8,
  wherein the processor is further configured to:
    receive, by the RLC layer, the available MAC grants from the lower MAC layer, and wherein the RLC header comprises a pre-determined fixed size.

11. The apparatus of claim 9,
wherein the processor is further configured to:
  determine, by the RLC layer, whether the available MAC grants are sufficient to include the at least one complete PDCP PDU packet,
  split the plurality of PDU packets into the at least one complete PDCP PDU packet and the new PDCP PDU packet based on the available MAC grants and available PDCP PDUs, wherein the new RLC SN is assigned to the new PDCP PDU packet and is different from the first RLC SN to the concatenated at least one complete PDCP PDU packet, wherein a new RLC header of the new PDCP PDU packet includes only the new RLC SN without including the RLC Sub header length information, and
  prepare the RLC PDU by accommodating the new PDCP PDU packet with the at least one complete PDCP PDU packet based on the available MAC grants,
wherein the at least one complete PDCP PDU packet are defined as PDCP PDU packets that can be completely transmitted and the new PDCP PDU packet is defined as a PDCP PDU packet that cannot be completely transmitted according to the available MAC grants,
wherein, based on the available MAC grants and the PDCP PDUs not being sufficient, the RLC PDU prepared with the at least one complete PDCP PDU packet, and
wherein the RLC PDU is transmitted with the at least one complete PDCP PDU packet.

12. The apparatus of claim 11, wherein the processor is further configured to:
  transmit, in subsequent PDUs, a remaining part of the new PDCP PDU packet that is unaccommodated in the RLC PDU with the assigned new RLC SN in a next MAC grant transmission cycle.

13. The apparatus of claim 12, wherein the processor is further configured to:
  receive the available MAC grants, by the RLC layer, for the next MAC grant transmission cycle,
  determine, by the RLC layer, whether the available MAC grants are sufficient to include at least one first complete PDCP PDU packet from the remaining part of the new PDCP PDU packet,
  split the remaining part of the new PDCP PDU packet into the at least one first complete PDCP PDU packet and a second new PDCP PDU packet based on the available MAC grants and the available PDCP PDUs, wherein the new RLC SN is assigned to the at least one first complete PDCP PDU packet,
  assign another new RLC SN to the second new PDCP PDU packet that is different from the new RLC SN, wherein a new RLC header of the second new PDCP PDU packet includes only the other new RLC SN without including the RLC Sub header length information, and
  prepare the RLC PDU by accommodating the at least one first complete PDCP PDU packet and the second new PDCP PDU packet based on the available MAC grants, wherein a remaining part of the second new PDCP PDU packet is transmitted in the next MAC grant transmission cycle.

14. The apparatus of claim 8, wherein the processor is further configured to:
  receive, from a receiver entity, an unsuccessful acknowledge message associated with a failure in transmission of the RLC PDU,
  retransmit, in a next transmission cycle, the RLC PDU to the lower MAC layer based on the receiving of the unsuccessful acknowledge message,
  receive, by the RLC layer in the next transmission cycle, newly available MAC grants from the lower MAC layer,
  determine a sufficiency of the newly available MAC grants to retransmit the RLC PDU in the next transmission cycle,
  retransmit, by the RLC layer to the lower MAC layer, the RLC PDU along with the RLC header similar to the failure in transmission of the RLC PDU based on the sufficiency of the newly available MAC grants,
  determine, by the RLC layer, whether the newly available MAC grants are insufficient to retransmit the RLC PDU with the newly available MAC grants, and
  re-segment the RLC PDU based on a result of the determining of whether the newly available MAC grants are insufficient, wherein the re-segmenting corresponds to the segmenting of the plurality of PDU packets into at least two RLC PDU packets which is truncated due to less availability of the newly available MAC grants.

15. The apparatus of claim 8, wherein the apparatus comprises a transmitter entity or as a receiver entity.

16. The apparatus of claim 15, wherein the transmitter entity or the receiver entity is located at a network side or the user equipment UE.

17. The apparatus of claim 9, wherein the new RLC SN assigned to the new PDCP PDU packet is different from the first RLC SN.

18. The apparatus of claim 8, wherein the pre-processing of the RLC sub header is performed after the receiving of the plurality of PDU packets and before the concatenating of the at least one complete PDCP PDU packet.

* * * * *